(12) United States Patent
Brown et al.

(10) Patent No.: US 9,208,500 B2
(45) Date of Patent: Dec. 8, 2015

(54) FIXED POSITION MULTI-STATE INTERACTIVE ADVERTISEMENT

(75) Inventors: Darrick Paul Brown, Redwood City, CA (US); David Ross Lerman, New York, NY (US); Troy William Young, Mill Valley, CA (US); Matthew Allen Sanchez, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 564 days.

(21) Appl. No.: 13/013,565

(22) Filed: Jan. 25, 2011

(65) Prior Publication Data

US 2011/0125594 A1    May 26, 2011

Related U.S. Application Data

(63) Continuation-in-part of application No. 12/572,109, filed on Oct. 1, 2009, now Pat. No. 8,386,317, and a continuation-in-part of application No. 12/756,934, filed on Apr. 8, 2010, now abandoned, said application (Continued)

(51) Int. Cl.
*G06Q 30/00*      (2012.01)
*G06Q 30/02*      (2012.01)
*G05B 19/418*     (2006.01)

(52) U.S. Cl.
CPC ............ *G06Q 30/02* (2013.01); *G06Q 30/0241* (2013.01); *G06Q 30/0277* (2013.01)

(58) Field of Classification Search
None
See application file for complete search history.

(56) References Cited

U.S. PATENT DOCUMENTS

| 5,848,396 A | 12/1998 | Gerace |
| 5,935,004 A | 8/1999 | Tarr et al. |

(Continued)

FOREIGN PATENT DOCUMENTS

| WO | 9741673 | 11/1997 |
| WO | 9741673 A2 | 11/1997 |

(Continued)

OTHER PUBLICATIONS

The Readership of Liquor'Ads Employing Appeals to Affiliation, Achievement, and Product-Attributes. Author Reid, Leonard N.; Pub Date Jul. 82. Note 15p.; Paper presented at the Annual Meeting of the Association for Education in Journalism (65th,Atheng, OH, Jul. 25-28, 1982).*

(Continued)

*Primary Examiner* — Victoria Vanderhorst
*Assistant Examiner* — Maria Vanderhorst
(74) *Attorney, Agent, or Firm* — Joann Dewey; Danielle Johnston-Holmes; Micky Minhas

(57) ABSTRACT

Computer-based systems and methods for a multi-state advertisement displayed at a fixed position on a primary display space of a display device. The fixed position advertisement remains in its fixed position in view of the user as the user scrolls the web page in various directions. A plurality of events trigger a change in the state of the multi-state advertisement, with the change in state resulting in a change of the advertisement content, shape, size, style and appearance. An embodiment deploys an initial video in combination with a billboard. When the interstitial video ends, the fixed position advertisement is sized down to a less obtrusive size, with the billboard and the interstitial video replaced with a navigation bar.

11 Claims, 21 Drawing Sheets

Related U.S. Application Data

No. 12/572,109 is a continuation-in-part of application No. 12/209,126, filed on Sep. 11, 2008, now Pat. No. 8,401,903, said application No. 12/756,934 is a continuation-in-part of application No. 12/209,126, which is a continuation-in-part of application No. 11/781,830, filed on Jul. 23, 2007, now Pat. No. 8,494,907.

(60) Provisional application No. 60/820,077, filed on Jul. 21, 2006.

(56) References Cited

U.S. PATENT DOCUMENTS

| | | | |
|---|---|---|---|
| 5,995,943 | A | 11/1999 | Bull et al. |
| 6,202,058 | B1 | 3/2001 | Rose et al. |
| 6,202,062 | B1 | 3/2001 | Cameron et al. |
| 6,230,204 | B1 | 5/2001 | Fleming |
| 6,385,591 | B1 | 5/2002 | Mankoff |
| 6,452,609 | B1 | 9/2002 | Katinsky et al. |
| 6,553,178 | B2 | 4/2003 | Abecassis |
| 6,690,481 | B1 | 2/2004 | Yeung et al. |
| 6,731,312 | B2 | 5/2004 | Robbin |
| 6,834,372 | B1 | 12/2004 | Becker et al. |
| 7,028,001 | B1 | 4/2006 | Muthuswamy et al. |
| 7,055,169 | B2 | 5/2006 | Delpuch et al. |
| 7,133,837 | B1 | 11/2006 | Barnes, Jr. |
| 7,188,085 | B2 | 3/2007 | Pelletier |
| 7,213,005 | B2 | 5/2007 | Mourad et al. |
| 7,386,473 | B2 | 6/2008 | Blumenau |
| 7,631,330 | B1 | 12/2009 | Des Jardins |
| 7,685,191 | B1 | 3/2010 | Zwicky et al. |
| 7,694,271 | B2 | 4/2010 | Becker et al. |
| 7,702,318 | B2 | 4/2010 | Ramer et al. |
| 7,734,503 | B2 | 6/2010 | Agarwal et al. |
| 7,840,911 | B2 | 11/2010 | Milener et al. |
| 7,930,206 | B2 | 4/2011 | Koningstein |
| 7,954,064 | B2 | 5/2011 | Forstall et al. |
| 8,234,275 | B2 | 7/2012 | Grant et al. |
| 8,306,859 | B2 | 11/2012 | Lerman et al. |
| 8,386,317 | B2 | 2/2013 | Brown et al. |
| 8,401,903 | B2 | 3/2013 | Lerman et al. |
| 8,494,907 | B2 | 7/2013 | Lerman et al. |
| 8,554,630 | B2 | 10/2013 | Grant et al. |
| 2001/0052000 | A1 | 12/2001 | Giacalone, Jr. |
| 2002/0016736 | A1 | 2/2002 | Cannon et al. |
| 2002/0052925 | A1 | 5/2002 | Kim et al. |
| 2002/0059590 | A1 | 5/2002 | Kitsukawa et al. |
| 2002/0067730 | A1 | 6/2002 | Hinderks et al. |
| 2002/0077900 | A1 | 6/2002 | Thompson et al. |
| 2002/0078456 | A1 | 6/2002 | Hudson et al. |
| 2002/0113813 | A1 | 8/2002 | Yoshimine |
| 2003/0101230 | A1 | 5/2003 | Benschoter et al. |
| 2003/0110130 | A1 | 6/2003 | Pelletier |
| 2003/0117433 | A1 | 6/2003 | Milton et al. |
| 2003/0120541 | A1 | 6/2003 | Siann et al. |
| 2003/0135464 | A1 | 7/2003 | Mourad et al. |
| 2004/0010806 | A1 | 1/2004 | Yuen et al. |
| 2004/0015398 | A1 | 1/2004 | Hayward |
| 2004/0093327 | A1 | 5/2004 | Anderson et al. |
| 2005/0038900 | A1* | 2/2005 | Krassner et al. ............ 709/231 |
| 2005/0096979 | A1 | 5/2005 | Koningstein |
| 2005/0096980 | A1 | 5/2005 | Koningstein |
| 2005/0137958 | A1 | 6/2005 | Huber et al. |
| 2005/0138656 | A1* | 6/2005 | Moore et al. .................... 725/45 |
| 2005/0216342 | A1 | 9/2005 | Ashbaugh |
| 2005/0216936 | A1 | 9/2005 | Knudson et al. |
| 2005/0267813 | A1 | 12/2005 | Monday |
| 2005/0275626 | A1 | 12/2005 | Mueller et al. |
| 2006/0107198 | A1 | 5/2006 | Solomon et al. |
| 2006/0173974 | A1 | 8/2006 | Tang |
| 2006/0173985 | A1 | 8/2006 | Moore |
| 2006/0253584 | A1 | 11/2006 | Dixon et al. |
| 2006/0277481 | A1 | 12/2006 | Forstall et al. |
| 2007/0043617 | A1 | 2/2007 | Stein et al. |
| 2007/0124756 | A1 | 5/2007 | Covell et al. |
| 2007/0233556 | A1 | 10/2007 | Koningstein |
| 2007/0276729 | A1 | 11/2007 | Freer |
| 2007/0300152 | A1 | 12/2007 | Baugher |
| 2008/0183568 | A1 | 7/2008 | Ida et al. |
| 2008/0244038 | A1 | 10/2008 | Martinez |
| 2008/0276269 | A1 | 11/2008 | Miller et al. |
| 2008/0276272 | A1 | 11/2008 | Rajaraman et al. |
| 2009/0024463 | A1* | 1/2009 | Szeto ............................ 705/14 |
| 2009/0271611 | A1 | 10/2009 | Roll |
| 2010/0004977 | A1 | 1/2010 | Marci et al. |
| 2012/0226659 | A1 | 9/2012 | Ball et al. |
| 2012/0239469 | A1 | 9/2012 | Steinberg et al. |
| 2013/0054559 | A1 | 2/2013 | Pettit |
| 2013/0073402 | A1 | 3/2013 | Lerman et al. |
| 2013/0117129 | A1 | 5/2013 | Brown et al. |
| 2013/0291012 | A1 | 10/2013 | Lerman et al. |
| 2014/0136347 | A1 | 5/2014 | Lerman et al. |
| 2014/0244407 | A1 | 8/2014 | Brown et al. |

FOREIGN PATENT DOCUMENTS

| | | |
|---|---|---|
| WO | 0038428 | 6/2000 |
| WO | 0038428 A1 | 6/2000 |
| WO | 0203706 A1 | 1/2002 |
| WO | 2012140464 A1 | 10/2012 |

OTHER PUBLICATIONS

The interactive living revolution. (Interactive Living). (interactive television still shows potential) Shaw, Russell Broadcasting & Cable, v 133, n 13, p. 3A(8) Mar. 31, 2003.

"Advertisers Must Use Interactive Tools With Care", Business Wire, Ovum Report Warns: Mobile Internet Not Just Another Channel for High-Volume Push., Jun. 5, 2000, 4 pgs.

"JUNO Gets Two More Patents Covering Offline Email", CBR Staff Writer; printed Jun. 11, 2012 from http://www.cbronline.cominews/juno_gets_two_more_patents_covering_offline_email, Dec. 14, 1998, 2 pgs.

"Lenel Systems International, Inc. Press Release", Newswire, Mar. 12, 1996, 4 pgs.

Shaw, "The interactive living revolution (Interactive Living) (interactive television still shows potential)", Russell Broadcasting & Cable, Mar. 31, 2003, vol. 133, No. 13, p. 3A(8).

Forbes, "The digital press", Mammoth Micro Productions, Churbuck, v152 , n7, Sep. 27, 1993., p. 136(2).

Think About That for a Minute, Anonymous, Cablefax. v12n51, Mar. 15, 2001, 1.

Office Action dated May 20, 2014 issued in related European Patent Application No. 07 813 238.8.

United States Patent and Trademark Office, "Non-Final Office Action Issued in U.S. Appl. No. 13/923,595", Aug. 1, 2014, 20 pages, United States.

Canadian Intellectual Property Office, "Office Action Issued in Corresponding Canadian Patent Application No. 2659042", Apr. 25, 2014, 4 Pages, Canada.

"America Online as RealNetworks Expand Relationship to Enable Streamed Interactive Marketing Services Using Helix Universal Servers", Sep. 19, 2002, PR Newswire.

United States Patent and Trademark Office, "Office Action Issued in U.S. Appl. No. 13/723,896", Dec. 29, 2014, 17 Pages.

Canadian Intellectual Property Office, "Office Action Issued in Canada Patent Application No. 2659042", Apr. 8, 2015, 7 Pages.

United States Patent and Trademark Office, "Final Office Action Received for U.S. Appl. No. 13/923,595", Apr. 27, 2015, 24 pages.

Shaw, "The interactive living revolution. (Interactive Living).(Industry Overview)", Publication—Multichannel news Publisher—Highbeam Research Date—Mar. 31, 2003.

"Office Action Issued in U.S. Appl. No. 13/013,565", Mailed Date: Dec. 19, 2014, 10 pages.

* cited by examiner

FIXED POSITION MULTI-STATE INTERACTIVE ADVERTISEMENT

CROSS-REFERENCES TO RELATED APPLICATIONS

This application is a continuation-in-part of and claims priority to U.S. application Ser. No. 12/572,109 entitled "Full Page Video Interstitial Advertisement," filed Oct. 1, 2009, and U.S. application Ser. No. 12/756,934 entitled "Fixed Position Interactive Advertising," filed Apr. 8, 2010; which are both continuation-in-parts of and claim priority to U.S. application Ser. No. 12/209,126 entitled "Interactive Advertising" filed Sep. 11, 2008; which is a continuation-in-part of and claims priority to U.S. application Ser. No. 11/781,830 entitled "Systems and Methods for Interaction Prompt Initiated Video Advertising," filed on Jul. 23, 2007; which takes priority from provisional patent application Ser. No. 60/820,077, filed Jul. 21, 2006, wherein the afore-referenced applications are hereby incorporated by reference.

BRIEF DESCRIPTION OF THE INVENTION

Computer-based systems and methods for a multi-state advertisement displayed on a fixed position on a web browser window displaying a visible portion of a web page. The fixed position advertisement remains in its fixed position in view of the user as the user scrolls the web page in various directions. The fixed position advertisement may be sized, shaped, or formatted based on the available space on the web page. A plurality of events trigger a change in the state of the multi-state advertisement, with the change in state resulting in a change of the advertisement content, shape, size, style and appearance. An embodiment deploys an interstitial video in combination with a billboard when the website initially loads. The interstitial video is deployed within the fixed position advertisement and resulting in a partial-page takeover that allows the user to remain in control of the website as the interstitial video plays. When the interstitial video ends, the fixed position advertisement is sized down to a less obtrusive size, with the billboard and the interstitial video replaced with a navigation bar. The combination of the interstitial video, the billboard, and the navigation bar, enable an engagement-based revenue generation model.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Traditional Internet or World Wide Web marketing/advertising operates on a "pay per impression" (PPI) basis. PPI is mostly used in association with banner advertising, where an advertiser pays a small amount to a website, advertising network, or other advertising reseller or aggregator (each a "publisher") each time the advertiser's advertisement is loaded into a user's web browser and displayed to the user (the "impression") by the publisher.

In addition to being paid by impression, publishers can also be paid if a user clicks on the banner advertisement (a "click through" event or "pay-per-click") and the user is directed to a website associated with the advertisement. Upon direction to the website, the advertiser becomes obligated to pay the publisher of that banner advertisement some amount of money for the referral. Many websites are completely funded through the mass collection of small payments from many different advertisers for both PPI and click through events.

In the same manner that advertising has changed over time, so too has the nature of the advertisements themselves. Many traditional advertisements have been static in nature, comprised of a picture and some text related to the subject matter being advertised. More recent advertisements have included multimedia object technologies (such as JAVA, SHOCKWAVE, FLASH, etc.) that utilize sound, video and/or animated content to grab a user's attention. Video advertising (whether live motion or animated) has frequently been used in association with other video content, such as playing a video commercial in association with a video trailer for a movie. Sometimes the video advertisement is displayed before the video content ("pre roll"), in the middle of the video content or a series of videos ("mid roll"), or after the video content ("post roll").

Whether the advertisement content is static or dynamic, the size of the advertisement is often limited to a set of predefined sizes by the publisher. For example, the standard wide and short, "full" banner advertisement, as established by the Interactive Advertising Bureau ("IAB"), is 468×60 pixels in size. The IAB has also set guidelines for other advertisement units, such rectangular and pop-up advertisements (336×280, 300×250, 250×250, 240×400 and 180×150), banner and button advertisements (728×90, 468×60, 234×60, 120×90, 120×60, 88×31, 80×15, 120×240 and 125×125), and skyscraper advertisements (120×600, 160×600 and 300×600). Rather than attempt to make all advertisement content fit every single advertisement unit, an advertiser will frequently generate advertisement content for use in just a couple of advertisement units, based on the sizes available, and force the publishers to fit that content into the space they have available on their websites. Publishers need a way to effectively select and arrange the multimedia content within an advertisement (including new forms of content) to fit many different advertisement units, as well as non-standard advertisement units, while maintaining the quality of the advertisement for the advertisers.

A problem faced by advertisers is that once the advertisement unit is placed on a website, there is no guarantee that the users will pay attention to it or will interact with it. This is especially the case on websites that host blogs and sites where the posting of user content and comments make the websites long, requiring the user to scroll to view the entire contents of the website. Advertisements are typically placed near the top of pages, ensuring that the user sees the advertisement when the page is loaded. However, the proliferation and common use of advertisements in the majority of websites has reduced the effect of such exposure. When the user is viewing a long page, many times users scroll down the web page, ignoring the advertisement and making the advertisement useless since it is not viewed, and if it is viewed, it is only viewed for a short period of time.

Likewise, while PPI advertising can initially be lucrative for a publisher, PPI has proven to be less effective over time because many users become overwhelmed with banner advertisements and begin to ignore them. For advertisers, this means that while they continue to pay for impressions, the value of such impressions is diluted due to the jaded nature of the users. While pay-per-click advertising addresses this issue for some direct-response oriented advertisers, many advertisers are just trying to build brand awareness rather than get users to their sites, so they are not interested in paying on a pay-per-click basis. Advertisers therefore need another method of measuring the effectiveness of an advertisement. The challenge is to develop an advertising system that forces greater accountability on those publishing advertisements to users and allows advertisers to more objectively measure the effectiveness of their advertisements on their intended audience.

DETAILED DESCRIPTION OF THE INVENTION

Although embodiments of the invention may be described in terms of various methods, the embodiments also relate to apparatus for performing the operations herein. This apparatus may be specially constructed for the required purposes, or it may comprise a general-purpose computer selectively activated or reconfigured by a computer program stored in the computer. Such a computer program may be stored in any form of computer readable storage medium. Likewise, the methods described herein are not inherently related to any particular computer or other apparatus. Various general-purpose systems may be used with programs in accordance with the teachings herein, or specialized apparatus for performing the required method steps could be constructed.

Figure 1:
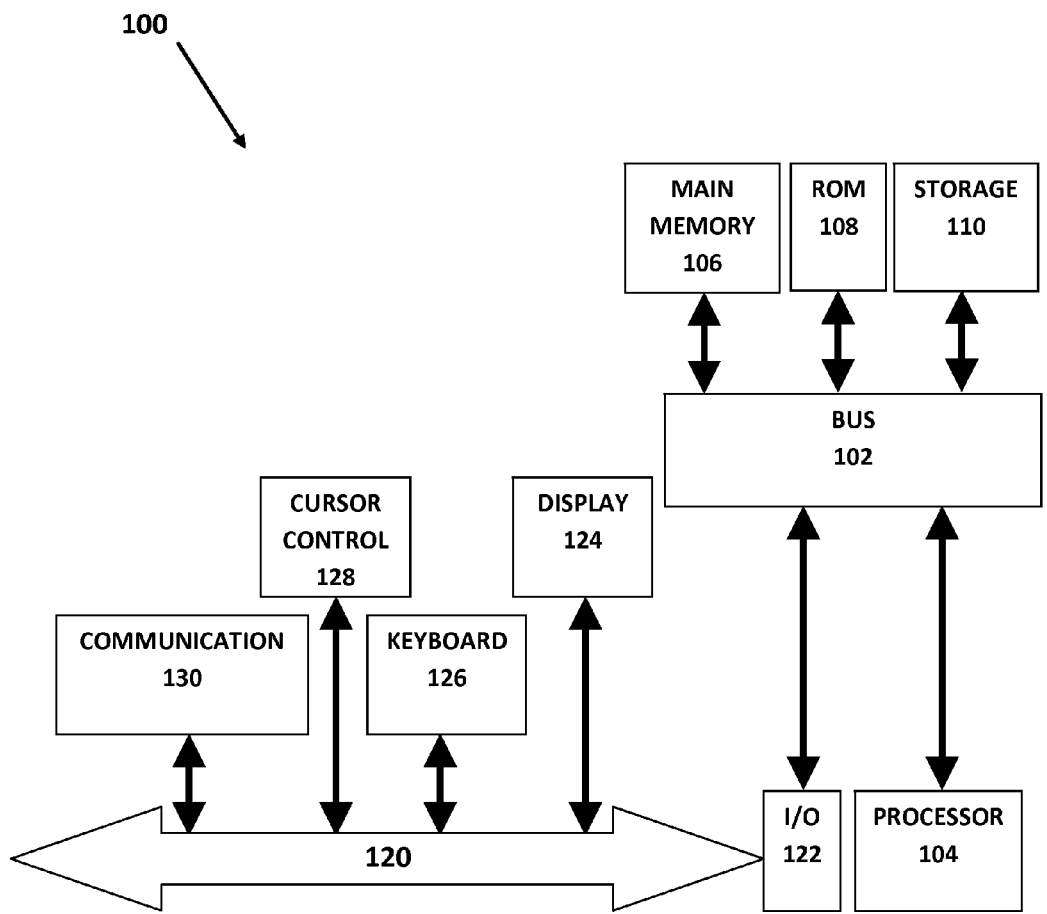
FIG. 1 illustrates an exemplary computer architecture for use with an embodiment.

FIG. 1 illustrates a general-purpose computer system that could be utilized to implement the systems and methods of an embodiment. The general computer architecture 100 depicted can be used to implement a user's computer, application servers, websites, advertisement managers, advertising servers, and other elements of an embodiment that are presented in further detail below. One embodiment of architecture 100 comprises a system bus 102 for communicating information, and a processor 104 coupled to the bus 102 for processing information. Architecture 100 further comprises a random access memory (RAM) or other dynamic storage device 106 (referred to herein as main memory), coupled to the bus 102 for storing information and instructions to be executed by processor 104. Main memory 106 also may be used for storing temporary variables or other intermediate information during execution of instructions by processor 104. Architecture 100 also may include a read only memory (ROM) and/or other static storage devices 108 coupled to bus 102 for storing static information and instructions used by processor 104.

A data storage device 110 such as a magnetic disk or optical disc and its corresponding drive may also be coupled to the bus 102 for storing information and instructions. Architecture 100 can also be coupled to a second I/O bus 120 via an I/O interface 122. A plurality of I/O devices may be coupled to I/O bus 120, including a display device 124, an input device (e.g., a keyboard 126) and/or a cursor control device 128. The communication device 130 allows for access to other computers (servers or clients) via a network. The communication device 130 may comprise a modem, a network interface card, a wireless network interface or other well known interface device, such as those used for coupling to an Ethernet, token ring, or other type of network.

In general, an embodiment relates to when a user accesses a website or other on-line location for displaying certain content on the user's computer (whether that computer is in the form of a desktop, laptop or other type of computing device, such as a personal digital assistance (PDA), a cellular phone, a smart phone or some other type of device) and the user is presented with that content, as well as additional content, such as one or more advertisements, through some sort of display. In one embodiment, an interactive advertisement consists of an initial advertisement first presented to a user/viewer as an invitation or teaser that attracts the user to the initial advertisement and encourages the user's engagement. If the user engages in an appropriate way with the invitation, the initial advertisement might change in some fashion, such as enlarging or taking over the user's display, to become what is referred to herein as an expanded message. The invitation or invitation advertisement would typically include one or more engagement properties that encourage the user to initially engage or interact with the advertisement content and so as to trigger the expanded message. Once the user so engages, an obligation by the advertiser to pay the publisher may be triggered. Payment obligations can vary based on the nature and extent of user engagement, as further described below.

The engagement properties include the user's movement of a cursor over the advertisement content (a "mouse over"), the user's entry of one or more keystrokes from a keyboard, clicking on or otherwise selecting the advertisement content, allowing a countdown or timer to expire as a result of a sustained mouse over the advertisement content, or some other form of user interaction with the advertisement. For example, when using a PDA or phone with motion detection capabilities, it might be possible to engage an advertisement by moving the PDA or phone in a particular way. Similarly, a motion or gesture recognition device associated with the user's computer could be trained to recognize certain user gestures to indicate engagement, such as a head nod, eye blink, hand motion, etc. Of course, many more methods of engagement or interaction are possible, so embodiments are not limited to just the manners specified herein.

To present these advertisements and their various features to the user, a file (such as an extensible mark-up language (XML) document/file) is served to an advertisement manager in communication with the accessed website/location and some form of content player within the user's computer. The advertisement manager would then take over control of the user's advertisement experience through the utilization of information contained within the XML file. Advertisement servers and/or content delivery networks that store digital advertising content or media assets (including text, images, video, animations, hyperlinks, widgets, dynamic micro-sites, programs, sound, slideshows, etc.) would then serve the content necessary to create the advertisements and their various features, as further described below, in response to the advertisement manager and content player (or other application within the user's computer that is calling for the advertisement).

Figure 2:
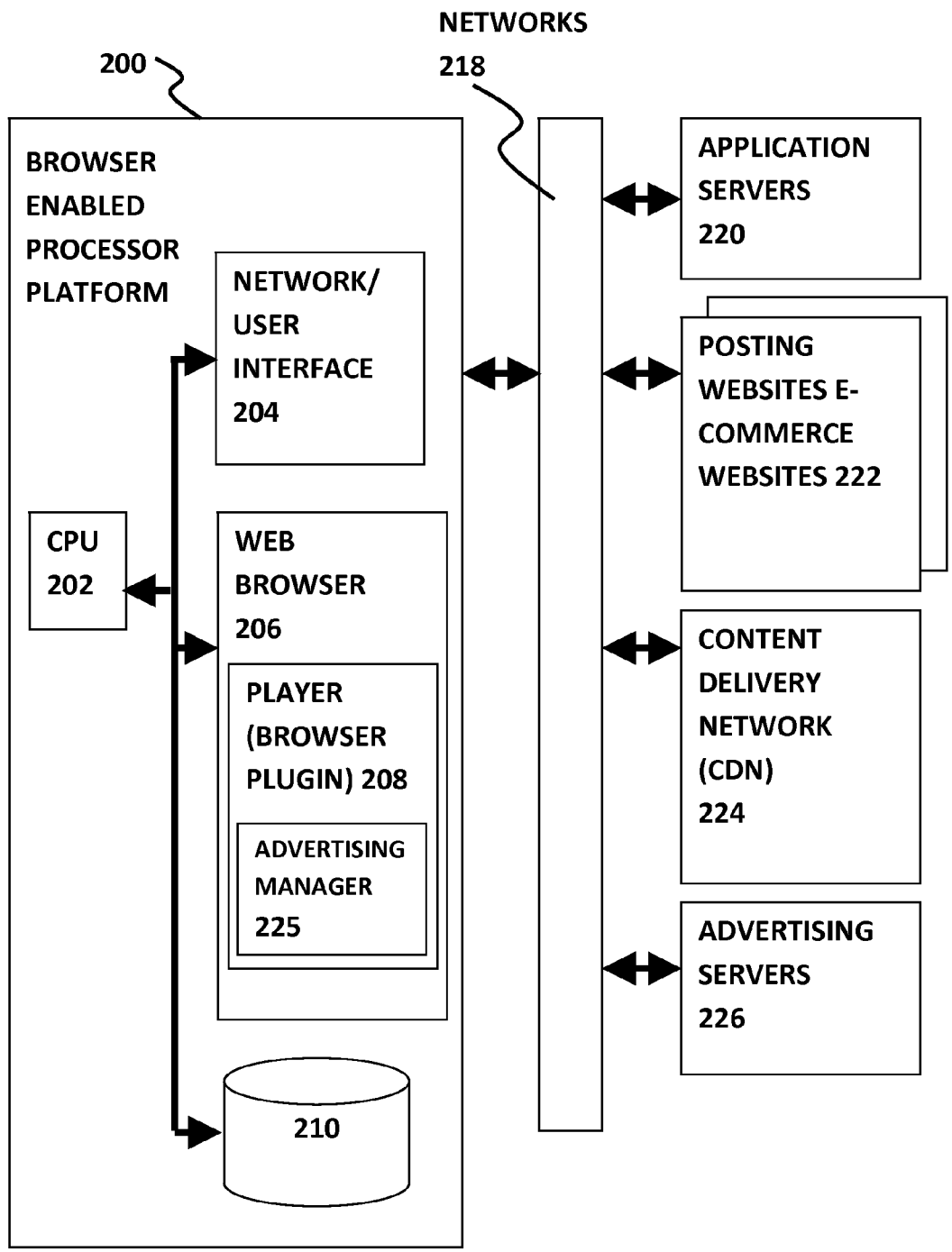
FIG. 2 illustrates a block diagram of a user computer, a network, websites, and other networked components that enable an embodiment.

FIG. 2 illustrates a block diagram of a typical user computer, a network, and other networked servers, websites and systems necessary to implement an embodiment. The browser enabled processor platform (i.e., the user's personal computer or laptop computer) 200 includes central processor unit (CPU) 202, a network/user interface 204, a web browser 206, which includes a player 208 (such as a browser plug-in), and a memory 210. The user of the processor platform 200 may interact with a variety of networks 218, application servers 220, websites 222, a content delivery network (CDN) 224 and advertisement servers 226.

The CPU 202 executes software code for the basic operation of the platform 200. The executable code may include an Operating System, programs, device drivers and other software components. Device drivers may include I/O device drivers and network interface drivers. A device driver may interface to a keypad or to a USB port. A network interface driver may execute protocols for the Internet, or an intranet, Wide Area Network (WAN), Local Area Network (LAN), Personal Area Network (PAN), extranet, or other network.

The memory 210 may contain transactional memory and/or long-term storage memory facilities. The memory 210 may function as file or document storage, program storage, or working memory. A working memory 210 may include, but is not limited to, static random access memory, dynamic random access memory, read-only memory, cache or flash memory. A working memory 210 may, for example, process temporally-based instructions, in part, by temporarily storing code relating to an action of a device and purging that code from the memory in close temporal proximity to the completion of the action. A long-term memory 210 may include, but is not limited to, a hard drive, portable drive, portable disk (e.g., a CD-ROM, DVD, etc.), tape facility, or other storage facility. A hardware memory facility may store a fixed information set (e.g., software code) including, but not limited to, a file, program, application, source code, object code, and the like.

The browser enabled processor platform 200 may also contain hardware for converting analog signals to digital data, or for converting digital signals into analog signals. For example, it may be necessary to convert an analog audio or video source into digital data for storage or playback. As another example, analog signals from a light sensor device could be converted into digital data for the storage of visual information for subsequent storage, playback, or transfer.

The browser enabled processor platform 200 may also include various I/O interfaces, such a hardware network interface, one or more displays, CD/DVDs, storage device, keypads/keyboards, printers, or other standard interfaces. An example of a hardware network interface may be a broadband connection, a dial-up connection, wireless, or other connection. An example of a display may be a monitor, plasma screen, or a liquid crystal display. An example of other standard interfaces may include, but is not limited to, a USB port, parallel port, serial port, microphone, or speaker.

Although the player 208 shown in FIG. 2 is configured as a browser plug-in, it could alternatively be any other form of software component that is adapted to be directly associated with a browser application 206. The player 208 may be a downloadable software component or delivered to the user of the browser enabled processor platform 200 in any number of other ways (e.g., delivered from a CD, DVD, memory stick, portable memory, FTP transfer, etc.). The networks 218 include the Internet and other possible networks, such as Wide Area Networks (WANs), Local Area Networks (LANs), or any other system for enabling two or more devices to exchange information. Further, the networks 218 may include wireless networks.

The player 208 may be a proprietary player or any other player because the advertising capabilities described herein are independent of the player. If the player 208 is a plug-in, it may be a FLASH plug-in player or some similar type of device. Other players are also envisioned and require other plug-in technology (e.g. WINDOWS MEDIA, REAL PLAYER or QUICKTIME players).

In an embodiment, the player 208 is adapted to become directly associated or integrated with the browser application 206. Before playing an advertisement, the user's browser enabled processor platform 200 may be checked to see if it already has the proper player 208 installed and if it does not, the user may be provided with an option to install one, or it may be installed automatically or in some other fashion. The player 208 will be installed in such a way that its functionalities (e.g., opening files from a variety of sources, playing video, music, etc.) are presented to a user through the network/user interface 210, which operates in conjunction with the web browser 206. The player 208 may not be visible to user. This configuration allows a user to interact with websites 222 through the web browser 206 and then interact with any of the player's 208 functionalities through the same user interface. The player 208 may also access the memory 210, such as a hard drive or other storage facility for the storage and retrieval of files.

A user interested in interacting with content presented to the user through a website 222, depending on the particular arrangement between the different systems on the networks, may interact with that content directly on the website 222, or through the content delivery network 224, or on the processor platform 200, if it has been downloaded to the processor platform 200. The content can also be presented to the user by streaming the content from the websites 222, content delivery network 224, or another processor platform (not shown) connected to the networks 218.

Advertising servers 226 are web or other Internet-based applications responsible for choosing an appropriate advertisement to be inserted into a given calling application (as further described below). The advertising servers perform a number of different functions. For example, according to one embodiment, advertising servers 226 provide advertising content to content delivery network 224, so that advertisements may be provided along with other content. Advertising servers 226 may be part of content delivery network 224, or independent servers. The advertising servers also provide XML files to the advertisement manager 225 within the player 208 that controls the display and interaction by the user with the advertising content. According to one embodiment, advertising servers 226 collect advertising content from various advertisers. Advertising servers 226 may also receive information from the content delivery network 224 pertaining to the users who view content through the content delivery network 224.

As noted above, the advertisement manager 225 controls the user's interaction with the advertising content played by the player 208. The advertisement manager 225 passes information about the user and the user's interaction to the content delivery network 224, which collects this information. The information includes the user's Internet Protocol (IP) address, geographic location, nature or theme of the website on which an advertisement is being displayed, the nature of the specific content viewed by the user, the user's web viewing history or patterns, as well as other psychographic data about the user (which may be received from a number of different sources). The content delivery network 224 may also collect information about the user's age, location, gender, income, education, ethnicity, product preferences and a variety of other demographic characteristics that are useful in matching an advertisement to a user. The content delivery network 224 may also collect information about the user's viewing experience such as the location of player 208, the genre of the content viewed, the type of content viewed (e.g., video, slideshow, widget), and the location of the player 208 within the browser.

This information can be aggregated with similar information about other users and transferred to various advertisers, who will pay for this information. According to one embodiment, the information is passed from the content delivery network 224 to the advertising server 226 once a user begins to watch content on a player. If a website has provided the player, it may also provide code that causes the user's information to be passed to the content delivery network 224 and advertising server 226.

A user choosing to interact with content on the content delivery network 224 may use his/her own browser enabled processor platform 200 equipped with a network browsing facility, such as the network interface 204 and player 208 to connect to a content file by interacting with a link or other such connection facility associated with a website 222 (or page thereof) as is described in much further detail below.

Figure 3:
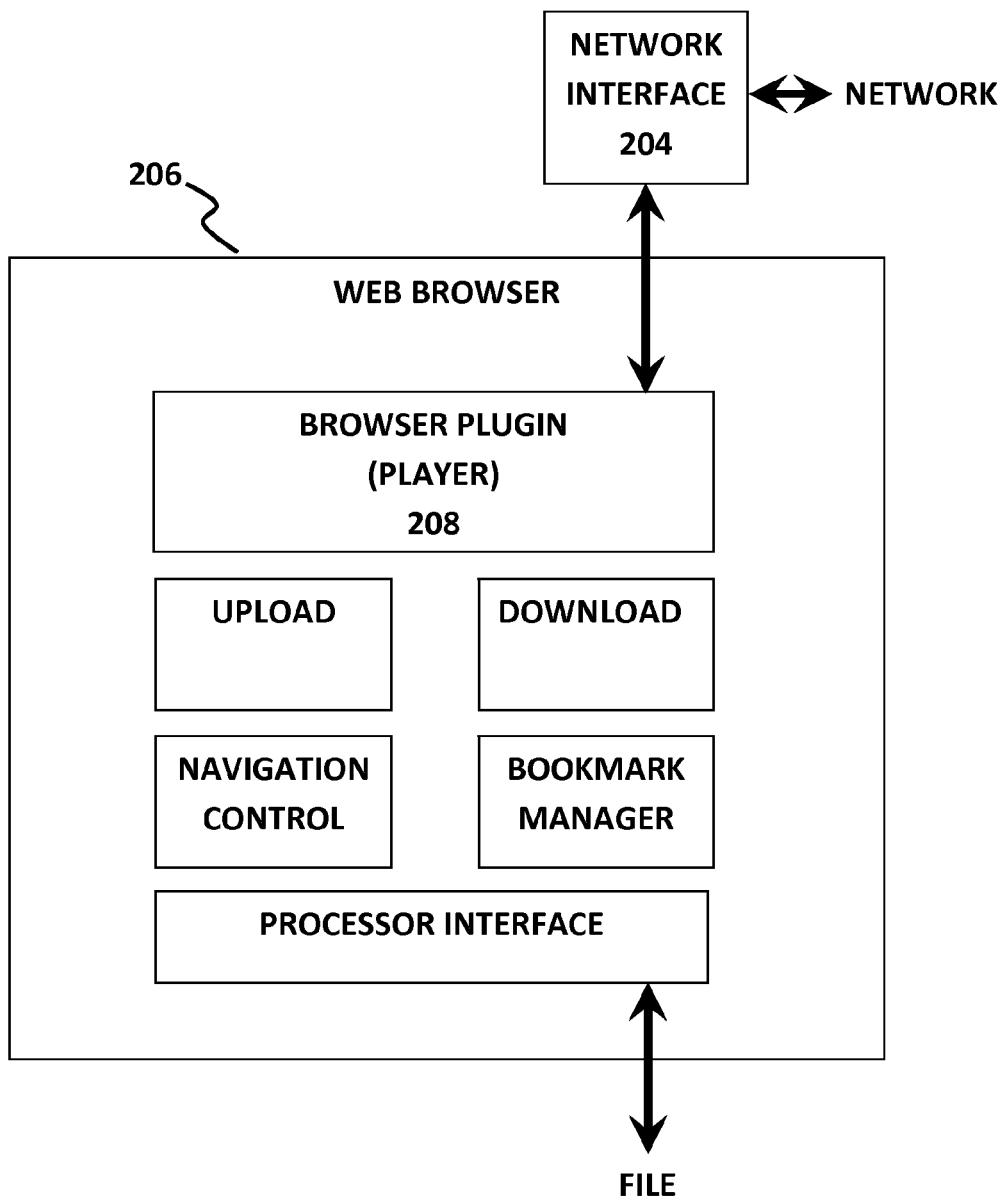
FIG. 3 illustrates a block diagram of an exemplary web browser of an embodiment.

FIG. 3 illustrates a block diagram of some of the functional aspects of an exemplary web browser 206, according to one embodiment. The web browser 206 may host the player 208 (e.g., as an integrated browser plug-in) and may provide for the interconnection of the player 208 with external components such as network 218 and file storage within networked storage, such as on the content delivery network 224. The browser 206 may provide upload and download functions through its own processor interface, or through the network interface 204, so as to transfer files to and from other processor platforms, provide user interface network navigation tools, and provide other network user interface tools. The web browser 206 may also provide for a web interface to the user with functions that include navigation control within web pages, bookmark management, favorite page storage and the like.

Figure 4:
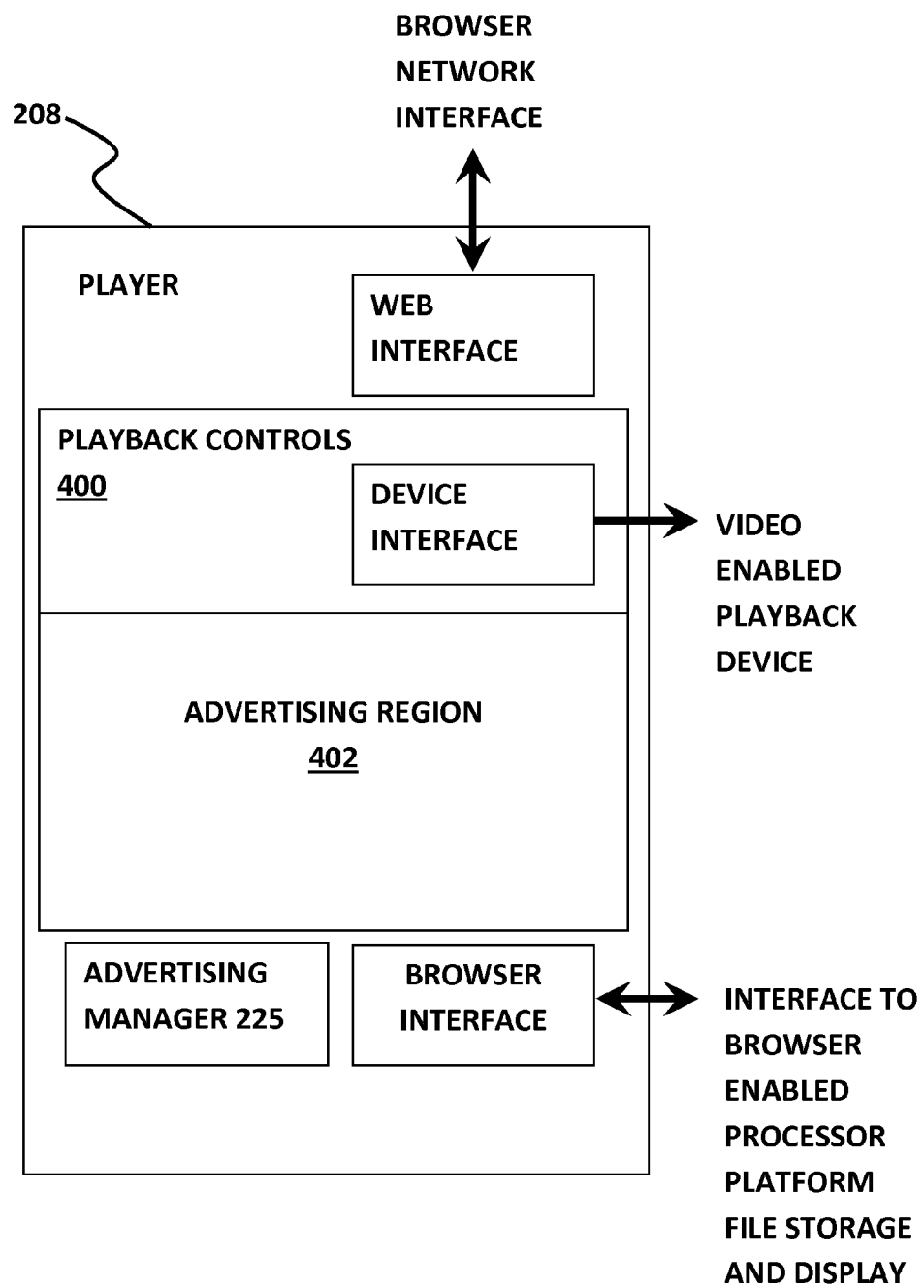
FIG. 4 depicts a block diagram of an exemplary player of an embodiment.

FIG. 4 depicts a block diagram of an exemplary player, such as player 208, according to one embodiment. The player 208 displays content selected by the viewer or made available to the user through a website. The player 208 also provides a user interface that allows the downloading, copying, viewing and interaction of content files previously stored on the content delivery network 224 or elsewhere, such as the advertising servers 226. The downloading of or other interaction with content files, as described herein, is enabled through the player's web interface to the browser network interface. The video viewing or navigation interface of the player 208 may be a FLASH-based, or other some other type of browser-based, player adapted to deliver content as a part of a website. The player 208 may also be a FLASH-based navigation interface which allows users to select content to view. Content files may also be stored in the browser enabled processor platform 200 through the player's browser interface. To the degree that video content is involved, playback controls 400 can provide typical VCR/DVR-type controls, such as play, stop, pause, rewind, fast forward, copy, paste, cut, save, and other such control features.

A client may embed the player 208 directly into any type of interactive electronic document using Hyper-Text Markup Language (HTML). When the player 208 requests content from the content delivery network 224, or the advertising servers 226, that content is then be made available to the player 208 for display and interaction. The application servers 220 monitor traffic to and from the content delivery network 224, take action when necessary, such as to delete content, and generate reporting data for advertisers.

The browser 206 may be a software application for navigating one or more networks 218, such as the Internet, intranet, extranet, a private network, and or content in file systems. The browser 206 also enables a user to display and interact with text, images, videos, audio and other content accessible through the networks 218. Such content may contain hyperlinks to navigate to other web pages at the same or different websites 222. Web browser 206 may allow a user to navigate and access information provided on many web pages at many websites 222 by traversing these links. Web browser 206 may also provide other features such as storing the address for a favorite website utilizing the browser's Bookmark Manager. Examples of bookmarked websites 222 may be hyperlinks to other personal sites, e-commerce sites, government sites, or educational sites. Another feature of web browser 206 may be caching, where recently visited websites 222 are transferred through the processor interface and stored in processor memory to decrease retrieval time for subsequent calls for the website 222. Examples of web browser 206 include the MICROSOFT INTERNET EXPLORER, MOZILLA FIREFOX, OPERA and APPLE SAFARI browsers. Although browser 206 may typically be used to access the World Wide Web, it may also be used to access information provided by web servers in private networks or content in file systems.

Web browser 206 may communicate with web servers through the network interface primarily using Hyper-Text Transfer Protocol (HTTP) to fetch web pages. HTTP may allow a web browser 206 to upload information across the network interface to web servers as well as download web pages from them. Web pages are located by means of a Uniform Resource Locator (URL), which may be treated as an address, beginning with http: for HTTP access. Many browsers 206 may support a variety of other URL types and their corresponding protocols. Examples of other URL types may be ftp: for File Transfer Protocol (FTP), rtsp: for Real-Time Streaming Protocol (RTSP), and https: for HTTPS (an SSL encrypted version of HTTP). The file format for a web page may be HTML. Browser 206 may also support formats in addition to HTML. Examples of other support formats may be JPEG, PNG and GIF image formats, and can be extended to support more through the use of browser plug-ins. An example of a browser plug-in may be MACROMEDIA's Flash or APPLE's QUICKTIME applications. The combination of HTTP and URL protocol specification may allow web pages to have embedded images, animations, video, sound, and streaming media into the webpage, or make them accessible through the web page.

The player 208 also includes an advertising region 402 that may or may not contain an advertisement. For example, the advertisement manager 225 may cause an image of a cola bottle to be displayed within a display window corresponding to a website 222. The cola bottle could be limited to being displayed within the advertising region 402, but need not be so constrained. The cola bottle could come out of the advertising message, such as an invitation or teaser advertisement, and move around the screen in some fashion, or when the website was first displayed, the cola bottle could be made to travel around different parts of the window or the display area of the user's computer, with the intent of capturing the user's attention and drawing them to interact with advertising messages within the advertising region 402 or elsewhere. These advertising messages may be self-activating or trigged by a user's interaction with some form of an interaction prompt within a window or the advertising region 402.

According to one embodiment, the invitation or teaser advertisement could be associated with a single advertiser or multiple advertisers. For example, the invitation could represent an advertisement for a single good or service from a single advertiser, or multiple goods or services from that advertiser. Likewise, multiple different advertisers could be represented by a single invitation space. Each good or service could be presented in a different way. For example, a rectangular-shaped invitation space could be broken up into four quadrants, with a different good or service presented in each quadrant of the space. Alternatively, the different advertisements could operate like a slide show, with one advertisement being shown in the invitation space for a number of seconds before being replaced by another advertisement.

This might make it possible for a publisher to fully exploit an advertising opportunity in a new way. For example, if a user within a particular demographic, such as 18-34 year old males, was not interested in the one good or service presented in an invitation with a single advertisement, the opportunity to engage that user could be lost. However, if the same user were presented with a number of different advertisements at the same time or in sequence, the user might be interested in one of the advertised goods/services and choose to engage with that advertisement. Once the user has engaged with that advertisement, if the user has a good experience, the user might be inclined to engage with some of the other advertisements provided in the same invitation.

Figure 5:
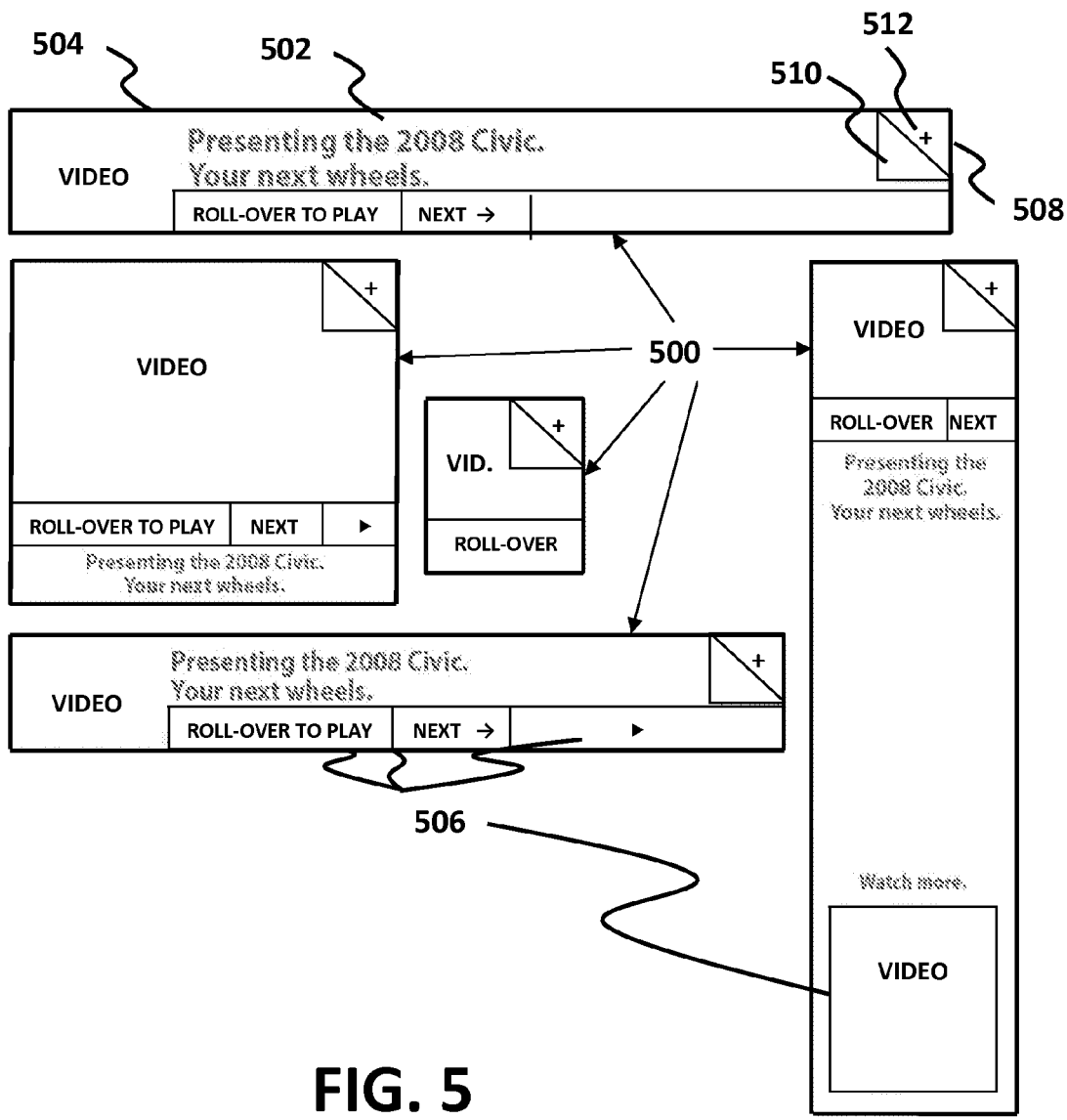
FIG. 5 illustrates a number of dynamically sized advertisement units, each including an engagement property and other features of an embodiment.

According to one embodiment, upon the user's interaction with the interaction prompt, a further advertising message is presented. For example, if the cola bottle was the interaction prompt, once the user clicked on the cola bottle, the invitation or teaser advertisement would transform into a full advertisement associated with the cola, either within the advertising region, or within all or some other part of the window. Once the user has experienced the full advertisement, the user would be able to close the full advertisement, as illustrated in FIG. 5 below, and return to the website or page or other area from which they started. When they do return to this area, the invitation they first viewed could be changed to represent some other advertised good or service, rather than continue to advertise the good/service with which they have already engaged.

As noted above, the cola bottle is just one example of an interaction prompt and the invention herein is hardly limited to just that example. Further interaction prompts include text (i.e., "Click Here to See Ad"), some other graphic (aside from the bottle) element, a playback control 400, a keyboard prompt, voice activation, etc. The types of interaction can vary greatly and could be different for different users depending on their psychographic data, demographic characteristics, or other factors, such as prior interactions with interaction prompts (i.e., if the user has only interacted with a particular type of interaction prompt in the past, the same type of interaction prompt may continue to be used for that user, versus switching to a different type).

Upon the user's engagement with the interaction prompt, a number of other different actions could occur in addition to presenting the user with a full advertisement. If the user was watching a video or some other form of content within the window at the time of the interaction, the viewing or navigation interface could be placed in a suspended state (i.e., paused). In one embodiment, such pause may be for the duration of the advertising message, until a user action occurs, or for some other duration. Of course, not all users will necessarily appreciate having the content they are viewing disrupted by an advertisement that they may have inadvertently engaged with by doing something as innocuous as moving their mouse. In one embodiment, the interaction prompt provides the user with a warning or counter to let the user know that what they are doing within the window is causing an advertisement to engage and that something will happen shortly if they do not do something to change the situation.

For example, as illustrated in FIG. 5, which shows a number of differently sized advertisement units (invitations or teasers) 500 comprised of text 502, images 504 and elements 506, an interaction prompt 508 (one of a possible plurality of engagement properties) is located at the top right corner of each advertisement unit. The interaction prompt is comprised of a turned corner 510 and an engagement warning or indicator that includes a change symbol 512 as the warning device. The turned corner 510 makes the advertisement look as though it is made of paper and that the upper right hand corner has been bent forward as if to turn the page. The turned corner 510 gives the user the visual image that there is something else behind the advertisement that could be reached by interacting with the upper right hand corner.

The engagement warning and change symbol 512, in this case a "plus" sign, warns or indicates to the user that there is something more associated with the advertisement. For example, the plus sign can warn the user that engaging with the advertisement unit 500 could cause the advertisement to change in some way, such as expanding, increasing or growing. Other stylized symbols could be used in place of a standard plus sign to indicate expansion, such as two intersecting curves that appear to form a plus sign, or many other variations that indicate expansion, growth or that something more might occur if the user interacts with the symbol. An expansion is just one way in which the change symbol 512 could change to warn the user. For example, as further discussed below, the change symbol 512 might be a minus sign to warn the user of a contraction if the symbol was engaged, or a counter to warn the user of the passage of time. Many other possible ways to warn the user are possible.

Thus, the user is presented with a number of visual clues that engagement with the interaction prompt 508 or the advertisement unit 500 might cause something to happen. As noted above, rather than simply having the advertisement units become active (i.e., change, start to play video or music, take over the window in which they are displayed, expand in size in some way, etc.) when the user moves the mouse over the interaction prompt 508 or over the advertisement unit 500, the interaction prompt could be used to provide the user with a warning or notice of engagement. For example, the change symbol 512 could change from a "plus" sign to a number, such as the number "3", when either the engagement prompt 508 or the advertisement unit 500 was moused over by the user. If the user continued to hold the cursor over the prompt 508 or unit 500 for more than a predetermined period of time, such as one second, the number "3" might change to the number "2". If the user continued to hold the mouse over the prompt 508 or unit 500 as the countdown continued, the advertisement would become fully active, such as by pausing the other content being viewed and expanding to take over more visual space on the user's computer display.

While the counter method described above is particularly intuitive, the systems and methods of embodiments are not limited to just a counter technique. Many other forms of user engagement warning or notices could be utilized. One significant value of the engagement warning is that it gives users an opportunity (a period of time) to decide whether they want to engage with the advertisement without any significant change occurring in the meantime. Many prior art techniques cause an immediate change, such as expanding the advertisement, stopping a video from playing, redirecting the user to a different website. Many users find such techniques to be bothersome and annoying. The engagement warning of an embodiment avoids this problem.

Figure 6:
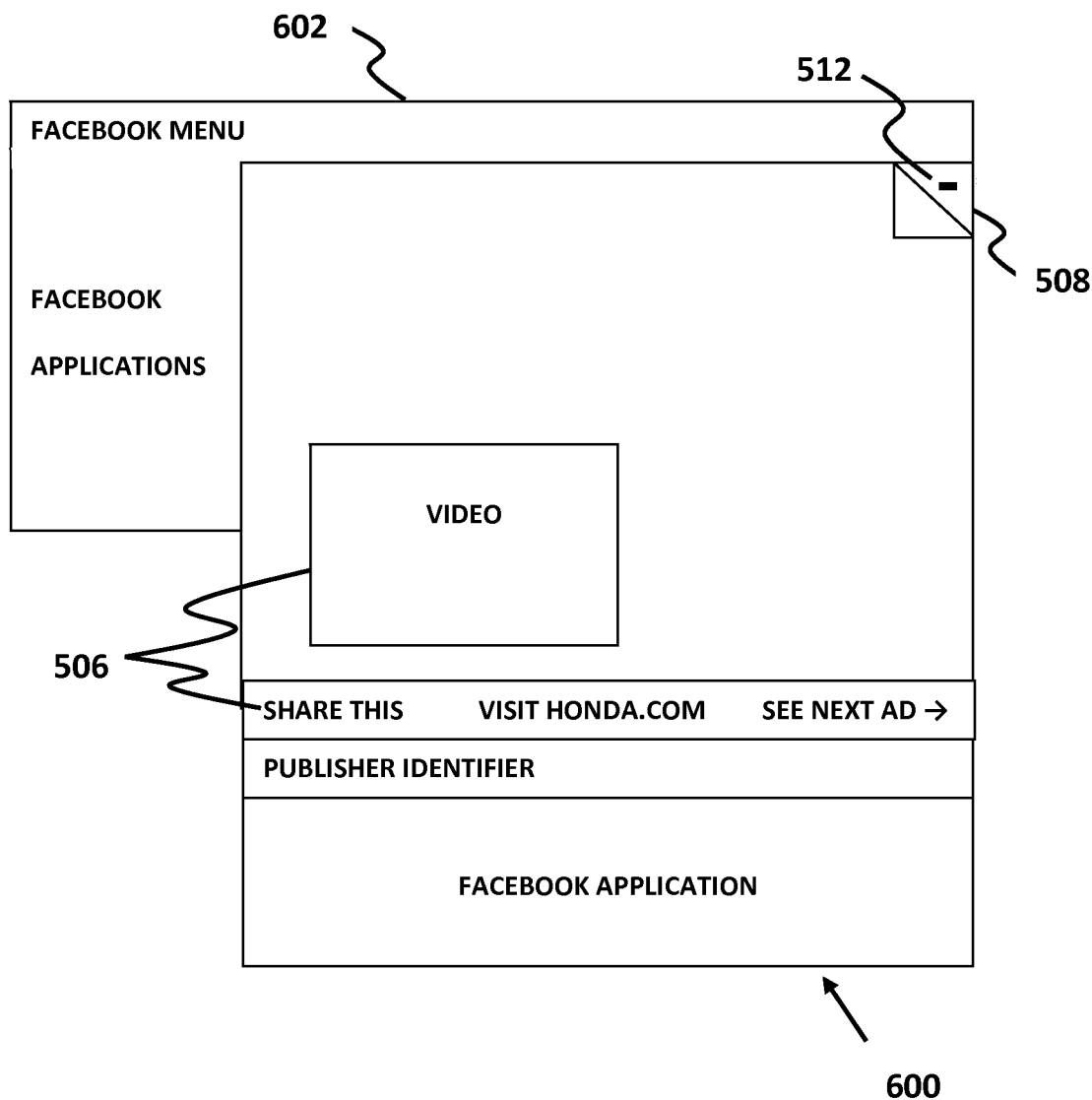
FIG. 6 illustrates an expanded advertisement from FIG. 5 within a website application.

FIG. 6 illustrates an expanded advertisement 600 within a website application 602, according to one embodiment. FIG. 5 provides an advertisement 300 for a HONDA CIVIC automobile. If the user engages with one of the advertisement units 300, the advertisement 300 might expand into the advertisement 600, as illustrated in FIG. 6. In FIG. 6, the advertisement 600 for the automobile has expanded to cover most of the content otherwise normally available on the user's website application 602, in this case a webpage within FACEBOOK. The change symbol 512 in FIG. 6 has changed to a "minus" sign to indicate that the advertisement is fully expanded and that the advertisement can be reduced to its original size by interacting with the change symbol 512 (i.e., clicking on the "minus" sign).

The expanded advertisement shares other features, in addition to the interaction prompt 508, such as elements 506. As an aside, although not shown in the figures, the visual transition that occurs between an advertisement unit and an expanded, active or full advertisement gives the developer of the advertisement an opportunity to identify itself. After a countdown passes or some other action has occurred that causes an advertisement to transition, the advertisement developer could briefly display its logo, name or some other identifier so that a user would be able to identify the entity that created the advertisement.

Returning to FIGS. 5 and 6, elements 506 enable the advertisement units 500 or expanded advertisements 600 to have a number of additional functions and to extend or otherwise expand the user's experience. As illustrated in FIG. 5, one element 506 instructs the user to "Roll-over" or "Roll-over to play" (some units 500 and advertisements 600 also include the universal "play" button to illustrate this feature to English and non-English readers). If a user rolled-over this element 506, then the image 504 could be transformed from just an image into video, or the unit 500 could be expanded to a larger advertisement 600. Another element 506 instructs the user "Next" and includes an "arrow" button to further illustrate this feature. Selecting the Next element would cause the advertisement 500 to be replaced by an entirely new (the "next") advertisement that had already been cued up and was ready to play in the event the next element was selected. Thus, if a user liked one advertisement, the user might be interested in engaging with additional advertisements from either the same advertiser, or related to the same product, or from the same publisher, etc. As previously mentioned, the next advertisement could also be for a completely different advertiser. After the "next" advertisement, there could be more next advertisements cued up and ready to become active, and on and on until all of the advertisements that could be shown were shown to that user.

Another element 506 might allow a user to watch a different video associated with the unit 500, or do other things, such as turn sound on or off, bookmark or save the advertisement, provide feedback, or control other aspects of the user's experience. For example, in FIG. 6, elements 506 enable the user to share the advertisement with a friend by opening an email application that can be used to email the advertisement to anyone. Elements 506 could also be used to enable the user to visit the advertiser's website (i.e., HONDA.COM). The number of element 506 functions that could be developed to expand or extend the user's experience is limitless, but a few related or additional examples are provided below with respect to FIGS. 7 to 12.

Figure 7:
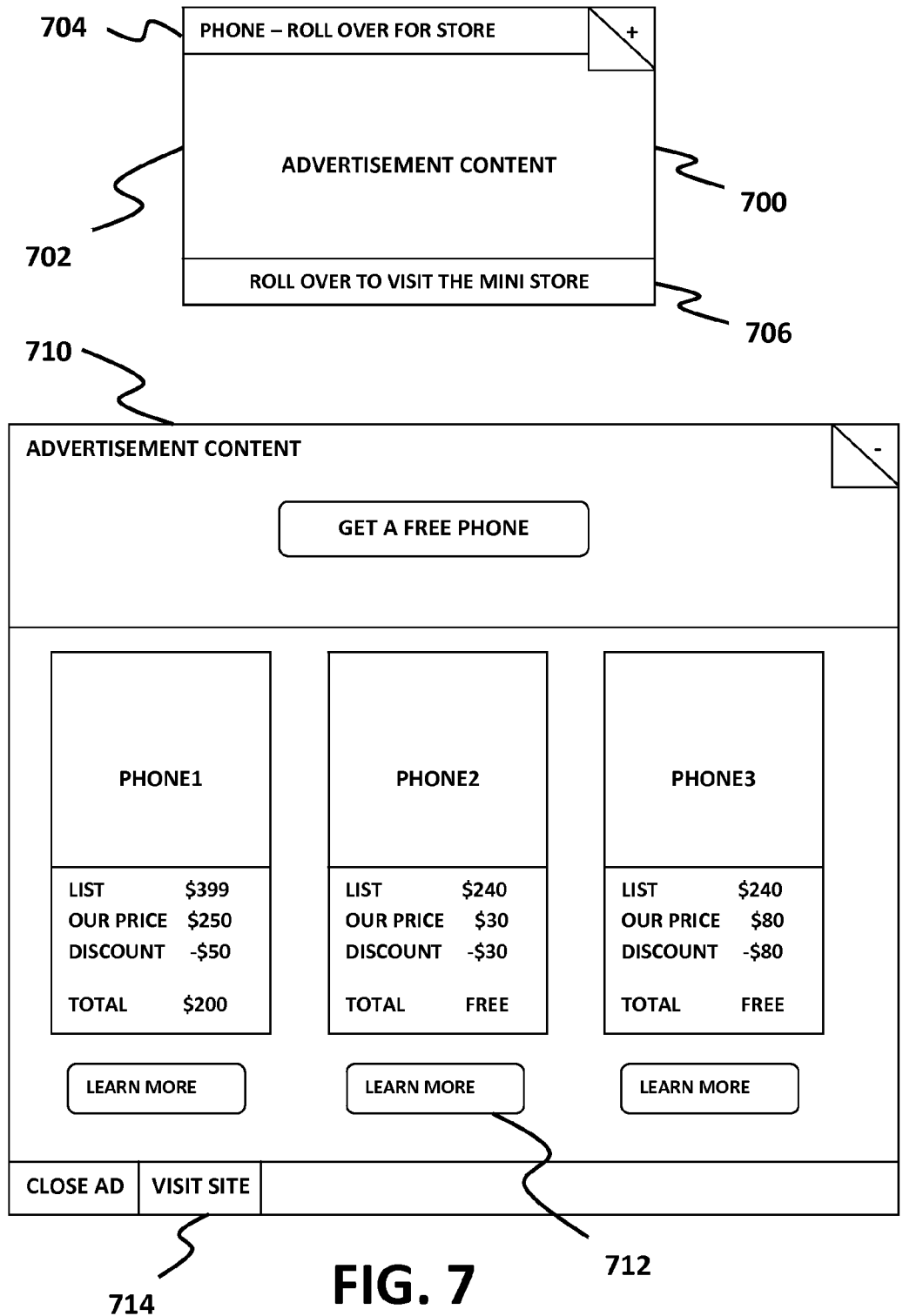
FIG. 7 illustrates a mini store invitation and expanded mini store advertisement in accordance with an embodiment.
Figure 8:
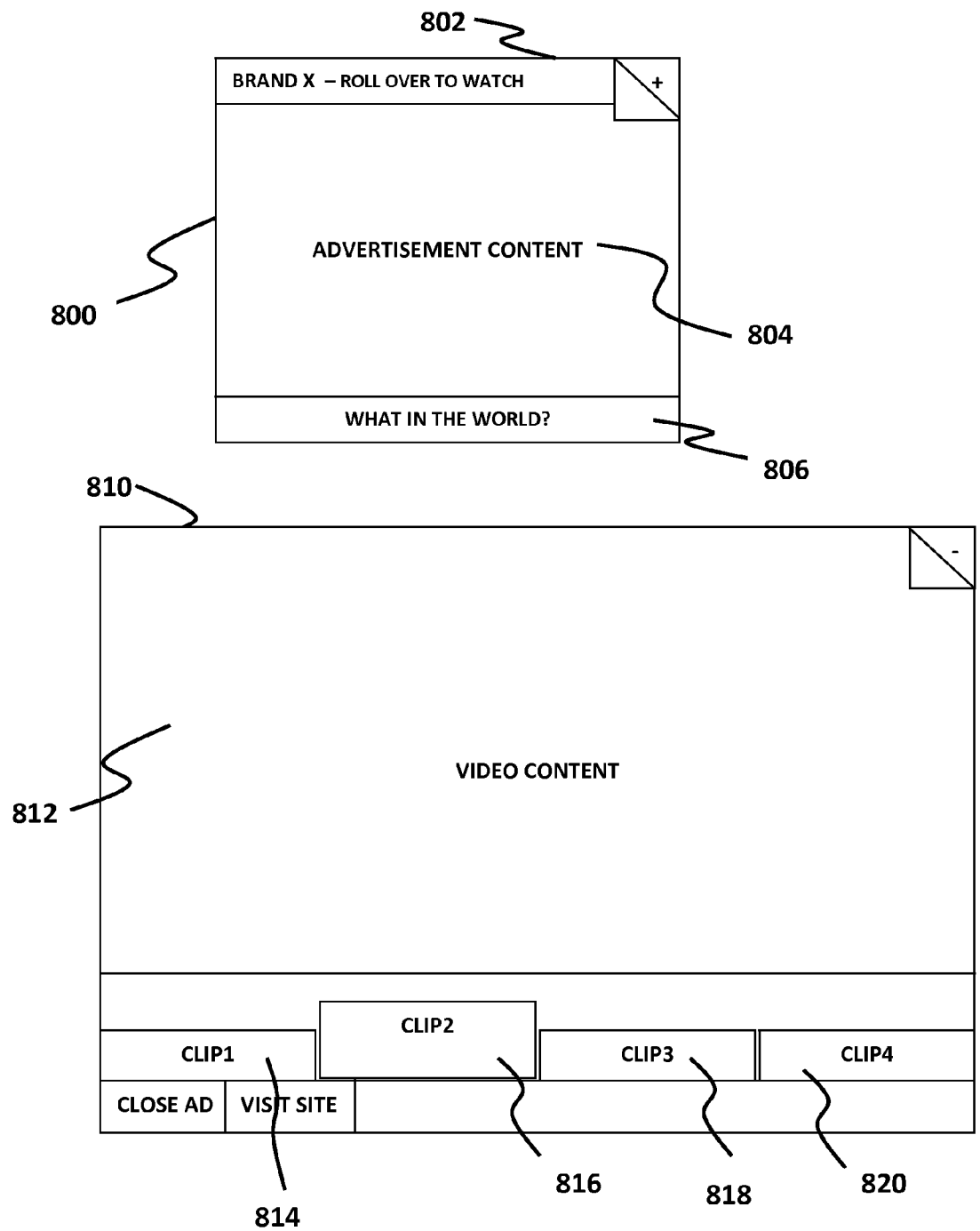
FIG. 8 illustrates a teaser advertisement and an expanded advertisement that uses readily navigable widgets to deliver additional content in accordance with an embodiment.
Figure 10:
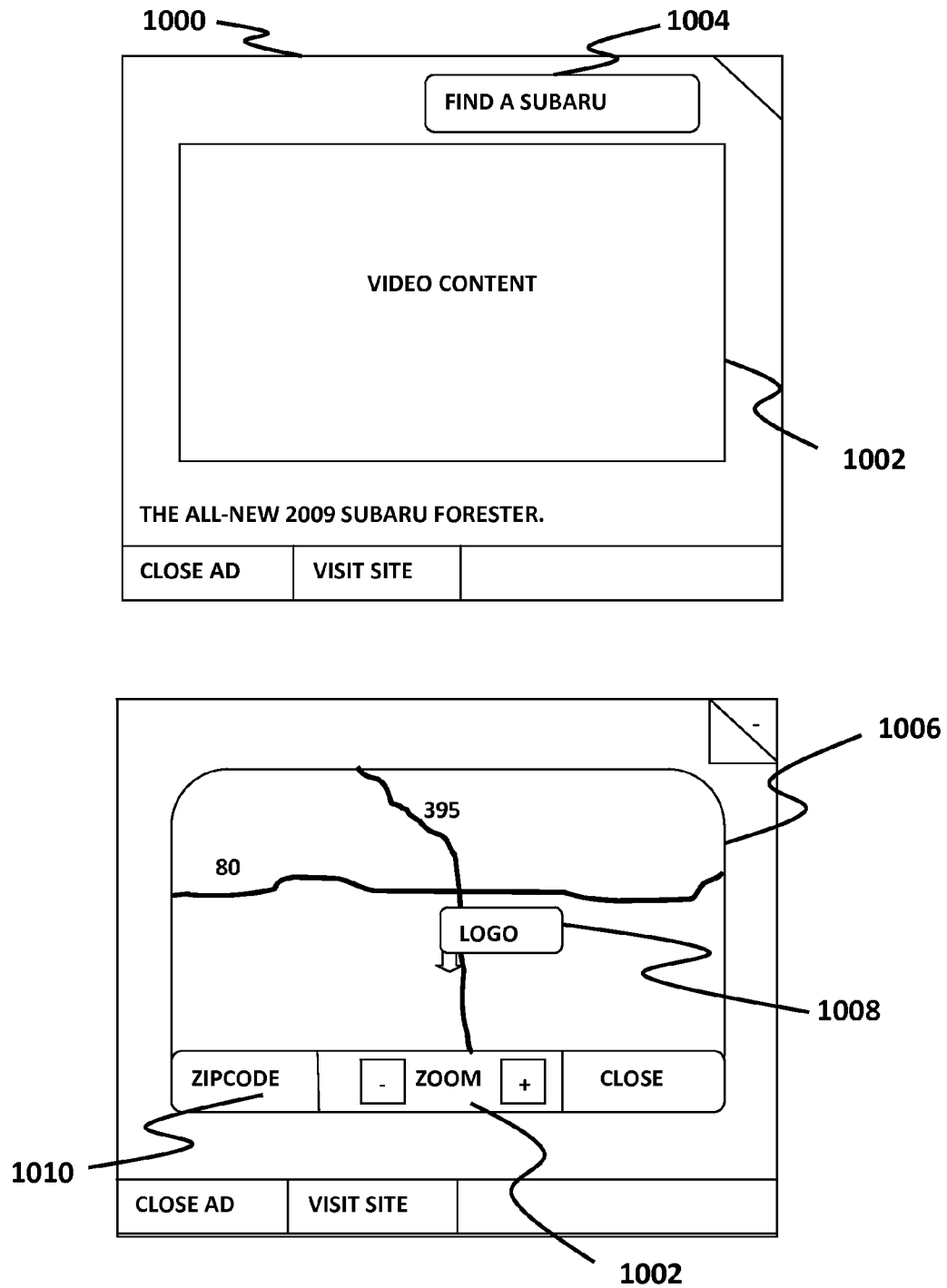
FIG. 10 illustrates an invitation and an expanded advertisement with a localization feature and a map widget in accordance with an embodiment.

FIG. 7 illustrates an invitation advertisement 700 for a phone company mini store that includes some kind of advertisement content 702, a title 704 with instructions on how to interact with the advertisement 700, and other engagement devices 706. The engagement devices can include a share tool, such as illustrated in FIG. 6, a localization tool or service, such as illustrated in FIG. 10, and a plurality of widgets, such as illustrated in FIG. 8, that display advertising content or information to the user and that can be navigated.

The share tool enables the user to send the interactive advertisement to a different computer. In an alternative embodiment, the share tool formats the interactive advertisement so the interactive advertisement will operate properly on the different computer.

In an embodiment, the plurality of widgets can be navigated by the user to access a plurality of the second set of media assets. Alternatively, the second set of engagement devices can include a share tool also enables the user to send one or more second media assets from the second set of media assets or one or more second engagement devices from the second set of engagement devices to a different computer.

In an embodiment, the first set of media assets, or the second set of media assets, or both the first set and the second set of media assets include a widget and the share tool formats the widget to be embedded in the different computer. Alternatively, the first set of media assets, or the second set of media assets, or both the first set and the second set of media assets include a widget and the share tool formats the widget as an attachment to an email message. In yet another embodiment, the first set of media assets, or the second set of media assets, or both the first set and the second set of media assets includes a widget and the share tool embeds the widget into an email message.

In an embodiment, the second set of engagement devices and the second set of media assets can be removed from the interactive advertisement by the user and used in a different location on the computer or on a different computer. Alternatively, the first set of engagement devices and the first set of media assets can be removed from the interactive advertisement by the user and used in a different location on the computer or on a different computer.

In yet another embodiment, the second set of media assets include one or more dynamic media assets, wherein the dynamic media assets include one or more localized media assets, wherein the second set of engagement devices include a localization tool that detects an IP address used by the computer, traces the IP address to a zip code, and informs the advertisement manager of the zip code, and wherein the advertisement manager selects localized media assets that correspond to the zip code from a dynamic content source. Alternatively, the first set of media assets include one or more dynamic media assets, wherein the dynamic media assets include one or more localized media assets, wherein the first set of engagement devices include a localization tool that detects an IP address used by the computer, traces the IP address to a zip code, and informs the advertisement manager of the zip code, and wherein the advertisement manager selects localized media assets that correspond to the zip code from a dynamic content source.

In an embodiment, the first set of media assets includes a plurality of different advertisements that are to be separately presented to the user and the first set of engagement devices includes a next advertisement tool that enables the user to move through the plurality of different advertisements.

When a user engages with the advertisement 700, it expands into advertisement 710 that provides a mini store where users can browse through numerous different products, in this case a number of phones, see the pricing for the offered products, and purchase or learn more about the products. For example, selecting the "Learn More" button 712 under Phone 2 might take a user to another website with more information about Phone 2, such as its features, or might take the user to an on-line purchasing page where Phone 2 can be purchased. Alternatively, if a user was interested in the advertiser (the phone company), but hesitant to buy from the advertisement, the user could select the "Visit site" button 714 and go directly to the phone company's website.

FIG. 8 illustrates an invitation advertisement 800 for Brand X, which includes a title 802, some form of teaser content 804 to interest the user, and other engagement content 806, in this case the provocative phrase "What in the world?" When the user engages with the advertisement 800, it expands into advertisement 810 that includes a video advertisement 812 and a number of easily navigated widget-based tabs 814 to 820. Advertisement 800 is meant to provide the user with the ability to view multiple different pieces of content while within a single advertisement 810. While one video or other form of advertisement content was being displayed, in this case Clip 2 of widget tab 816, the corresponding tab is raised above the other tabs so the user knows which one is playing. To select different content, the user would mouse over either widget tabs 814, 818 or 820 and select one of those tabs, or interact with them in some other appropriate manner. This advertisement formats allows the advertiser to present significantly more content to a user, without requiring the user to exit the webpage or website they were at when they engaged the invitation advertisement.

The widgets may also be presented as push buttons or menus that expand horizontally or vertically when pressed. The widgets may also be enhanced with various graphic displays in order to encourage the user to interact with the widgets. For example, the widgets may glow, starting with a bright background color or border color, fading slowly to a softer color, and again slowly increasing in color brightness. The widgets may also become animated when the user moves the mouse over the widgets. For example, a widget may jitter in place while the user moves the mouse over the widget.

Figure 9:
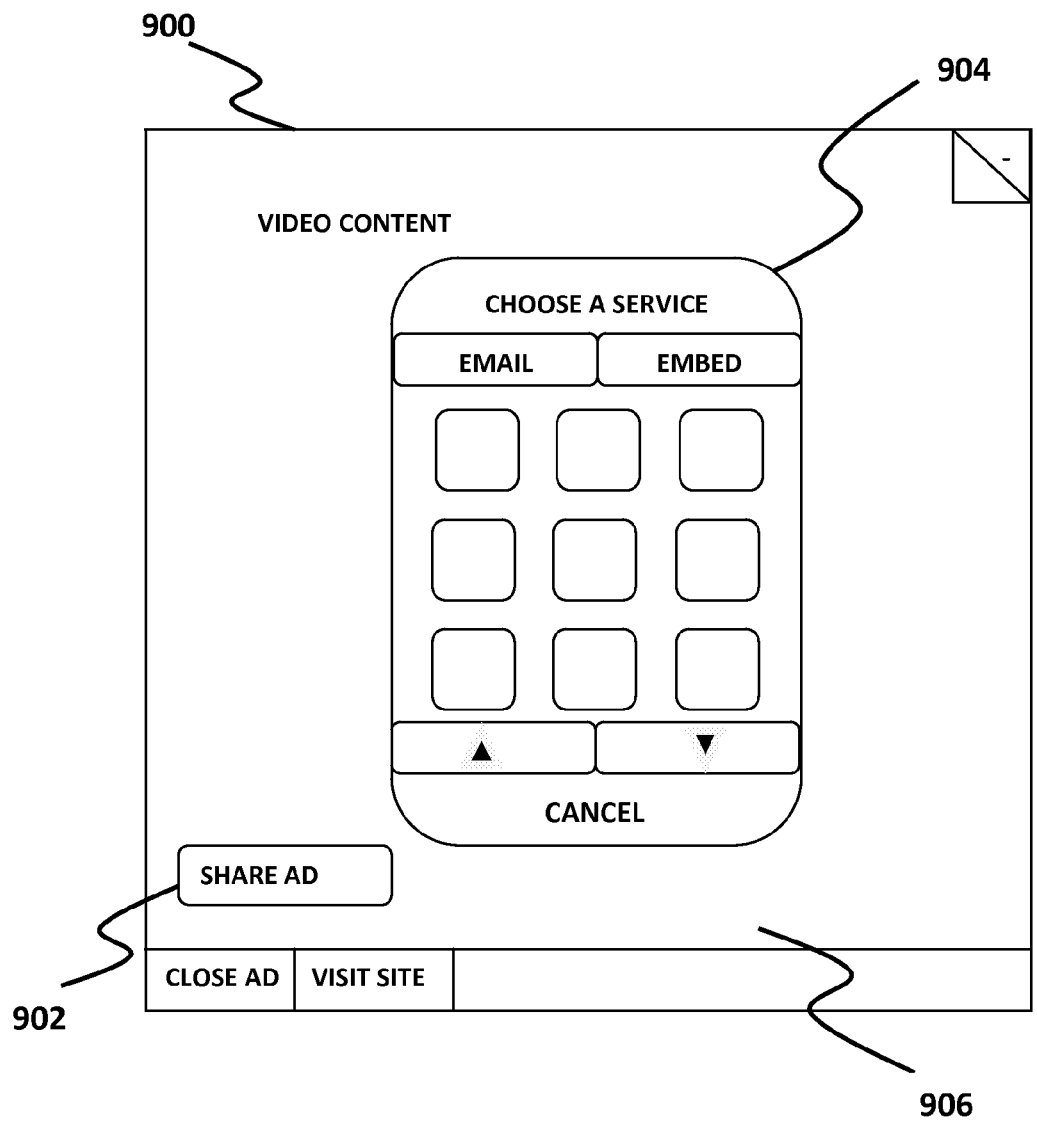
FIG. 9 illustrates an expanded advertisement that enables sharing or saving of some component of the advertisement or the entire advertisement through operation of a widget in accordance with an embodiment.

FIG. 9 illustrates an advertisement 900 that enables the user to share with, or push the advertisement 900 to other people by using the share tool. The share tool can consist of a hyperlink, a button 902, or some other widget that allows the user to share the interactive advertisement, or part of the interactive advertisement content, to a second user or to a second computer. FIG. 9 is an example of the share tool consisting of a button. When the user selects the "Share ad" button 902, at any time, a widget 904 will appear in front of the advertisement content 906 (which may be paused or suspended as a result). The widget 904 allows the user to email the advertisement 900 (including any video, widgets, engagement features and other content) to another person (through the user's default email application) or embed the advertisement 900 in a blog, social networking website or other host environment, such as the MYSPACE website, FACEBOOK website, etc. To simplify the process of emailing the advertisement 900, the widget 904 will prepare the advertisement 900 as an attachment to an email, embed it within the body of an email message, or provide a link to the advertisement that can be inserted into an email message. To simplify the process of embedding the advertisement 900 in any of a large number of other environments, the widget 904 will prepare the advertisement 900 based on the host environment selected by the user from a scrollable list. When a host environment is selected, the user will either be presented with the code or other tools needed to insert the advertisement 900 into the desired host environment.

FIG. 10 illustrates an advertisement 1000 that includes a localization service or tool that enables the publisher to push local experiences into the advertisement. The localization service captures the Internet Protocol (IP) address for the user and traces that to a zip code, city, or region that corresponds to the user's physical location. The user can then be presented with information relevant to the advertisement that has a local connection to the user. For example, advertisement 1000 plays a video 1002 for the 2009 SUBARU FORESTER automobile and invites users to find their local dealer by selecting the "FIND A SUBARU" button 1004. When the user selects button 1004, a map widget 1006 opens that shows the user where the nearest dealer is to the user based on the zip code traced by the localization service. As illustrated in FIG. 10, the user is physically located in the Reno/Sparks area of Nevada, and a dealer, as indicated by the icon 1008, is located near highway 395 just south of the highway 395/highway 80 interchange. Since IP addresses do not always trace to the exact location of the user, the map widget 1006 includes a zip code entry section 1010 so the user can manually enter a zip code and a zoom feature 1012, so the exact location of the dealership can be located. Alternatively, the map widget may consist of an embedded third party mapping website, such as GOOGLE Maps or YAHOO! Maps, that allows the user to zoom in and zoom out, and to move the map around, allowing the user to pinpoint the location with the mouse.

Figure 11:
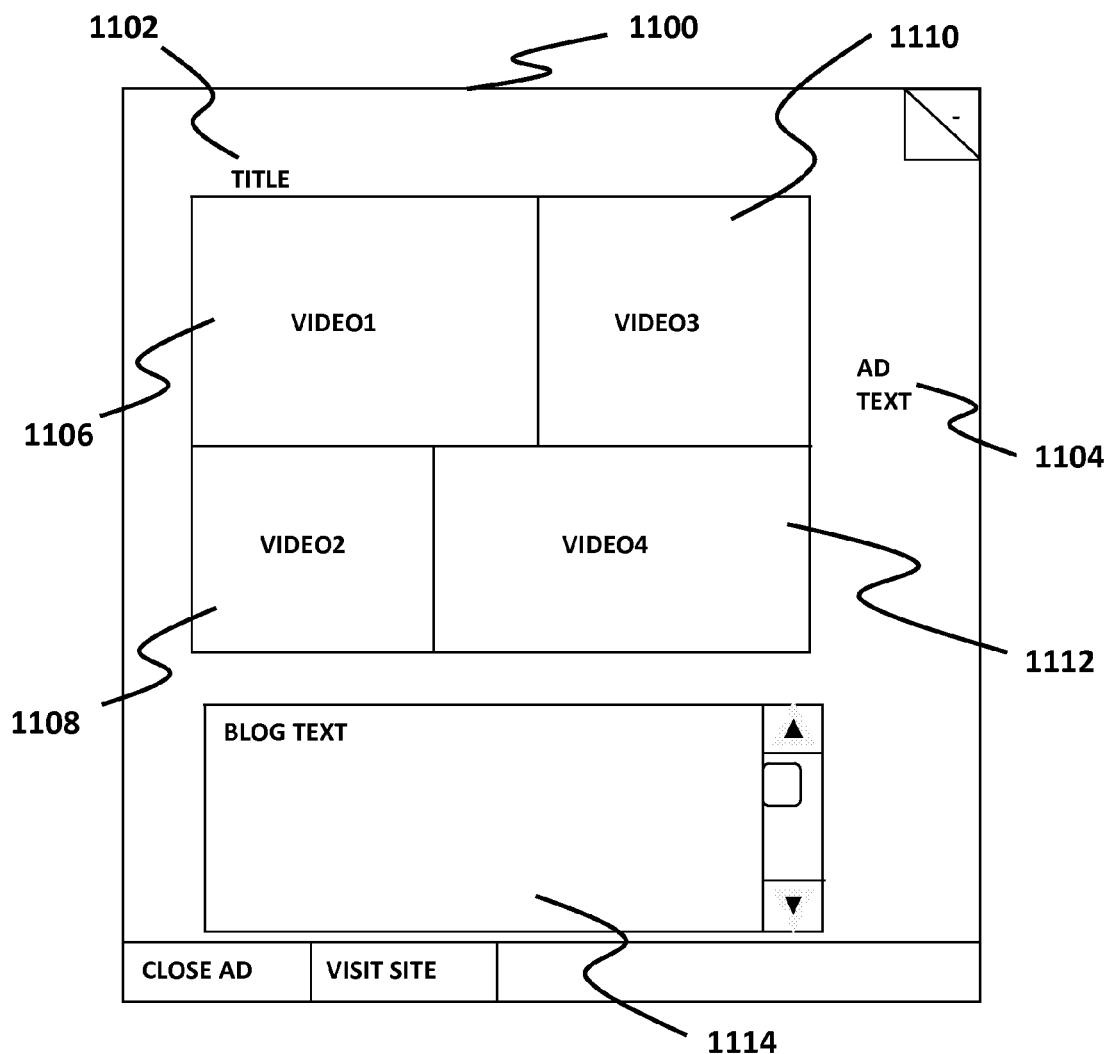
FIG. 11 illustrates an expanded advertisement with dynamic components in accordance with an embodiment.

FIG. 11 illustrates one example of a dynamic content advertisement 1100. The expanded advertisement 1100 includes a title section 1102, some advertising text 1104, four video areas (video1 1106, video2 1108, video3 1110 and video4 1112), and a blog text section 1114. The video areas depict four different video scenes, each of which might be driven from a live video feed, such as streaming video. The blog section 1114 includes text that is being fed into the advertisement 1100 through an RSS feed. Any other frequently updated content could also be fed into the section 1114, such as pod casts, news headline, stock quotes, etc. In FIG. 11, a series of blog entries are listed in section 1114. Although one is shown, a user could access the other blog entries by moving arrow keys on their keyboard, clicking a selection button while they are moving the mouse over the section 1114, etc.

Figure 12:
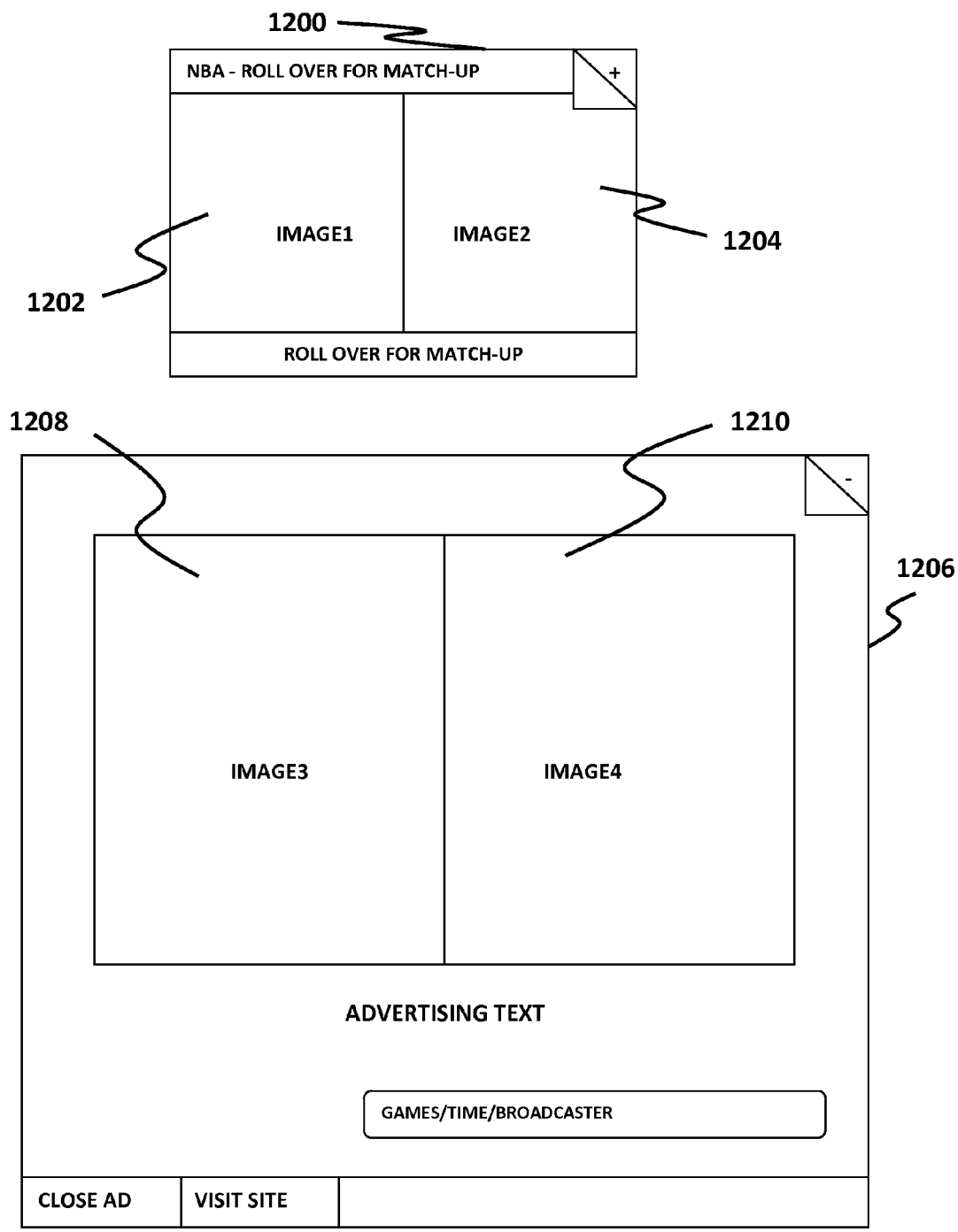
FIG. 12 illustrates an invitation and an expanded advertisement with dynamic components and localization features in accordance with an embodiment.

FIG. 12 illustrates another example of a dynamic content advertisement. In FIG. 12, invitation or invitation advertisement 1200 is an advertisement for the National Basketball Association (NBA) finals. It illustrates two images: image1 1202 includes a picture of one basketball player (or a logo or similar representation) from one team; and image2 1204 includes the picture of a different player, logo, representation, etc. from a different team. Illustrating the images of different basketball players from different teams is meant to express the competition between the opposing teams. If the user engages with the invitation 1200, the full advertisement 1206 opens and displays additional content, which might include the images (1208 and 1210) of more players, video footage of the teams playing, etc., and includes the names of the teams that will be playing, what time they will play, and what broadcaster is carrying the game. Combining this RSS feed data with a localization service would enable the playing time to be adjusted for the user's actual time zone. Additional dynamic data, such as other games being played, etc. could also be displayed, such as in area.

In addition to the dynamic advertising elements discussed above, many other dynamic elements could be utilized in an advertisement, such as a widget, a real-time or downloadable application, a dynamic micro-site (i.e., a mini-site or weblet that is comprised of a web page or cluster of pages), a slide show, etc. The content illustrated also need not be static, whether in the original or expanded form. Hence, the images or text or other elements within an advertisement unit could be changed on some periodic basis, such as after a period of time, after the user's cursor has spent so much time over the element in question, after the user has engaged with the advertisement in some other way, or in many other ways, as further noted below. Further, as noted with respect to the share feature of FIG. 9, the advertisements or the elements of the advertisement can be capable of independence from the website 222 or other environment in which they first displayed. For example, if the advertisement was created as a standalone application or as a micro-site, versus being delivered by the browser, it could be removed (i.e., downloaded) from the website on which it appears and used on its own in many other environments, e.g., dragged and dropped onto a desktop or other storage area, emailed or shared with others, embedded in other electronic documents, etc.

As noted above, some or all of the components of the advertisement, versus the advertisement as a whole, could also have independence. For example, a user may be able to grab a component of the advertisement, such as a widget, an application, a slide show, etc., and drop it onto their desktop or some other location, or otherwise downloaded in some form. Preferably, the component would include some indicator of the advertiser or the good/service being advertised. A video, an animation, music, etc., that could be removed from the advertisement and used in other ways could significantly enhance the value of the advertisement to the advertiser. Once removed from the advertisement, the component could express additional independence and could be re-sizeable and changeable in other ways.

Having described some of the various types of advertisements that could be generated, the components and content of such advertisements, and some of their many features, it is now necessary to describe the manner in which advertisements are generated, such as in the context of the architecture illustrated in FIG. 2. To generate an advertisement in a webpage or flash player, for example, a request must be made for the advertisement to be inserted in the webpage or player, such as player 208. The application making the request or call is referred to herein as the calling application. The calling application could come in many different forms: (1) a standard website or web application that is based on HTML, JAVASCRIPT or CSS code; (2) a rich-media application delivered via a web-based plug-in, such as a ADOBE FLASH plug-in; (3) a rich-media component of a web application, such as a FLASH or QUICKTIME-based video player, embedded game or widget; (4) a mobile application, such as an IPHONE or mobile JAVA application; or (5) any other Internet connected application.

In one embodiment, the calling application makes a request or call to the advertisement manager 225 to embed an advertisement in the webpage or player via an application programming interface (API) provided by the advertisement manager 225. The advertisement manager 225 is a collection of code that manages the user's advertising experience, including loading the XML file, referred to above, from the advertising servers 226, and rendering the advertisement as part of the calling application (in this case player 208). Although the advertisement manager 225 is shown in FIG. 2 as part of the player 208, the advertisement manager 225 is a code library that could reside in any of a number of places within the user's computer 200 or elsewhere that is accessible to the user's computer 200. For example, the advertisement manager 225 could be a FLASH file loaded into the player 208 that is application specific (e.g., .swf).

The API of the advertisement manager 225 allows the calling application to pass on targeting data, such as the user's age and gender, and specifics on what kind of advertisement it wants, such as the available size or particular advertisement types. The code and structure of the API varies depending on the type of calling application. For example, the API for a video player may be totally different than the API for a web application, which may be totally different than the API for an IPHONE application. The API can also provide extra functionality, such as instructions regarding how an advertisement should be shown, instructions for hiding an advertisement, or a callback for informing the calling application that an advertisement has been shown or is being shown.

Once a request for an advertisement has been made to the advertisement manager 225 from the calling application, the advertisement manager 225 would then make a request to the Advertising Server(s) 226 to get a particular advertisement and, in the process, pass along any data about the user, the kinds of advertisements that are allowed, the available size and other data. The advertising server 226 then picks an advertisement from a set of available advertisements based on the incoming data and other internal data, such as which advertisements perform best, which advertisements make the most money, how many of each advertisement it is supposed to deliver, etc. Once the advertising server 226 has selected an advertisement to send to the calling application, the advertising server 226 will return a file to the advertisement manager 225 to the calling application. This file includes advertising metadata corresponding to the selected advertisement. The form of the file varies depending on the type of calling application or the type of the advertisement, but is most often an XML file and is referred to herein accordingly.

The advertising metadata defines the various elements (including text, image, video or other rich-media elements) to be used in a particular advertisement. The advertising metadata also describes how those elements should be displayed, what engagement data for that advertisement should be collected and where it should be sent, and other data necessary to render and track the advertisement. Although the advertising metadata describes how elements should be displayed, it does not control how the elements will actually be displayed on the user's computer 200, which is managed by the advertisement manager 225. For example, to display an advertisement on a user's computer 200 comprised of a video and a headline of text, the advertisement manager (typically JavaScript and/or ActionScript) running on the user's computer ("client-side code"), would read the XML file (including the advertising metadata) to determine what content to use (i.e., the video and headline), download that content from the advertisement servers or the content delivery network, and determine where to put the video and the headline (and how big to make them) based on the space (i.e., size and shape) available for the advertisement.

Upon receipt of the XML file, the advertisement manager 225 parses the advertising metadata and loads any advertising media assets referenced in the advertising metadata from an advertising media server (advertising servers 226). Advertising media assets are media elements (media files) used in an advertisement, such as images, videos, flash games, etc. The advertising media server is a web application that is capable of delivering the advertising media assets, which are referenced by the advertising metadata by their retrieval location (such as a URL) within the advertising media server. The advertising media server can reside on any web server, collection of web servers, or a network (such as the content delivery network 224), and may or may not be on the same physical server as the advertising servers 226.

Once the advertising media assets have been loaded, the corresponding advertisement can be displayed to the user. How and when the advertisement manager 225 loads the advertising media assets and displays the advertisement varies based on the advertisement type, the calling application, the available space, and other factors. For example, if the available space is very small, the advertisement manager may choose not to display all of the advertising media assets for the advertisement or to reduce the font size, or if the calling application is a video player, the advertisement manager may choose not to display the advertisement until a certain amount of the video has been played. Likewise, based on the time of day, or the passed on data regarding the user's age, gender, location, etc., the advertising media assets might be varied.

As a result, the advertisement unit is not limited to the standard formats specified by the IAB, but rather can be dynamically sized and structured to work in any space provided. As shown in FIG. 5, the text 302, images 304, elements 306, and interaction prompt 308 of the advertisement unit 300 can be sized, arranged, altered, left out, or added to as needed to form an advertisement for any situation. Thus, an advertisement could be created for any standard sized advertisement unit as well as any non-standard size unit by having the advertising manager 225 decide what advertising media assets best fit within the space provided for the advertisement and then arrange those assets accordingly.

If there is very little space for the advertisement, then it may only be comprised of a line of text 302 (or just a word) and an interaction prompt 308 (which may be the word itself or some other visible or invisible element). For example, a crown unit (i.e., an advertisement which sits on top of other content) could be dynamically generated in a very constrained space that may only allow for a single word or line of text in a small font or a single image or graphic. With a little more space, it might be possible to add an image 304 or larger image. An even large space could allow for a larger version of the same image 304, the text 302 in a bigger font, additional text, various elements, a video box, etc. Any of the advertising media assets of the advertisement unit could be dynamically refreshed once the advertisement was generated, or selected in some sort of dynamic fashion so that different users seeing the same advertisement at the same time might get different content/assets, or even the same user seeing an advertisement for the same thing might get different content/assets each time.

As noted above, any component of the advertisement specified by the XML file could also be dynamic. For example, any advertising media asset could be supported by an RSS feed, thereby enabling that asset to be frequently updated or modified. The advertisement manager 225 may also make subsequent (even frequent) requests to additional servers for dynamic advertising data, to replace content, or to implement extra functionality. For example, as illustrated in FIG. 12, if an advertisement is for a television show or game, the advertisement manager 225 may make a request to a server for the show's/game's air time in the user's time zone, which could then be displayed with the advertisement. Extra functionality, such as the ability to send an advertisement to a friend via email, might be accomplished by having the advertisement manager 225 contact an email server for processing the email, as illustrated in FIG. 9.

These various advertisements can also be constructed from reusable structural and/or advertising media asset components. For example, an animation used in a ticker advertisement (an advertisement shown in a ticker, i.e., a small area that overlays or obstructs content) for one advertiser could be used by the same advertiser in a different type of advertisement, or even a different advertiser for a different product/service. This can be accomplished by having multiple XML files specify the same media asset(s). These same media assets would then be downloaded from the advertising media server (i.e., content delivery network 224) for use in the different advertisements. Other types of advertisements that can be specified to the advertisement manager by the XML file include, without limitation:

a pre roll advertisement (i.e., an advertisement shown to the user before showing the content the user requested);

a post roll advertisement (i.e., an advertisement shown after the user completes viewing the desired content.);

a mid roll advertisement (i.e., an advertisement shown in the middle of the desired content.); and a menu advertisement (i.e., an advertisement show in an interface inside the video player where the user is selecting additional content or accessing additional functionality like emailing or embedding the player).

In addition to playing or helping to facilitate the presentation or playing of an advertisement, the advertisement manager 225 serves other purposes. The advertisement manager 225 can be used to track user events, such as each instance where the user pauses or plays the content, or when the content begins and ends. Thus, the advertisement manager 225 continues to control the advertising experience by managing the advertisement, running any animations or videos, checking for user interactions, and updating the advertisement as needed. The advertisement manager may also track certain events and send data on when or how the event occurred and send that information to an advertising data collection server for reporting or billing, as further described below.

The combination of the player 208 and appropriate coding with the advertisement servers 226, advertisement manager 225, and content delivery network 224 allows interactive advertisements to be provided to any websites that hosts a player 208 of any form. The present method and system also allows for advertisement to be structured, shaped and positioned in any manner that will invite a user to watch an advertiser's message.

Figure 13:
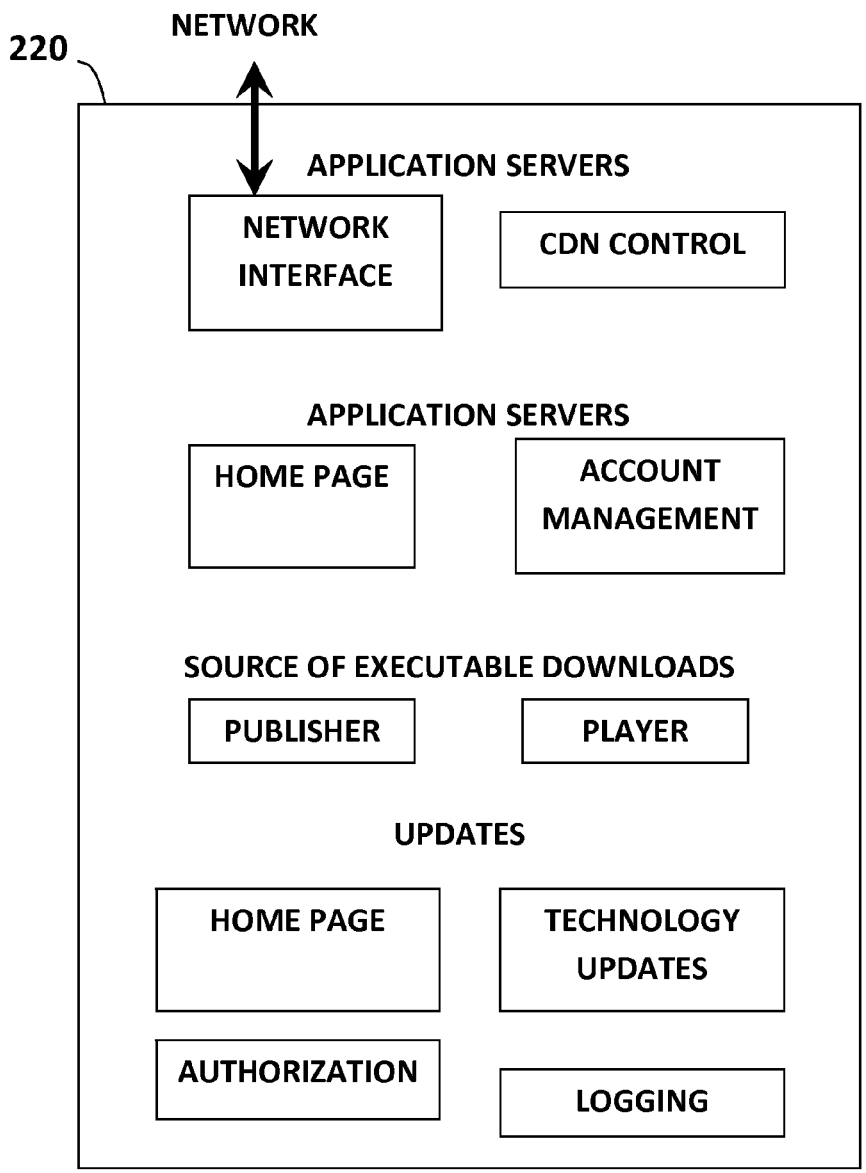
FIG. 13 depicts a block diagram of exemplary application servers of an embodiment.

The remaining major component of FIG. 2 is the application servers 220. FIG. 13 depicts a block diagram of an exemplary application server(s) 220, according to one embodiment. The application server(s) 220 may provide central control of certain system platform functions such as providing content delivery network 224 control, providing a central website for the publisher's home page, providing account management (including reporting server functions and collecting and storing data about users), providing a source of executable downloads for the player 208 browser plug-ins, providing automatic updates to player 208, providing logging of data flow and usage, providing authorization for use of the components of the system (such as uploading content to the content delivery network 224), providing other controls to facilitate the manipulation and viewing of content files, and providing the advertising data collection server. This latter server is a web application which collects engagement data. When a user interacts with a particular advertisement, the advertisement manager 225 notifies the advertising data collection server of the engagement, which in turns stores the data for future use. Data from the advertising data collection server can then be used to provide reports and to determine how much the advertiser should pay if the advertiser is paying on an engagement basis.

As noted in the Background of the Invention section, in the past, advertisers have been obligated to pay publishers for each advertisement primarily based on pay-per-impression (PPI) or pay-per-click (PPC) compensation models, even in the absence of any evidence that a user has paid any attention to the advertisements in question. Only paying publishers when a click through occurs (the other primary form of compensation), however, goes too far the other way in that it is not always reasonable or appropriate to expect a user to have to leave the website they are viewing to go to another website corresponding to the advertisement. An embodiment provides an alternative to PPI and PPC compensation models without requiring click through as a compensation alternative. An embodiment couples the engagement-based advertisement described above with a new compensation model that forces greater accountability on publishers and enables advertisers to more objectively measure the effectiveness of their advertisements.

In one embodiment, when a user engages or interacts with the displayed advertisement, such as by moving the cursor over the advertisement unit 500 or the interaction prompt 508 (or engaging in one of the other manners described above), the advertiser is assured that the user has seen the advertisement and paid some attention to it. Any act of engagement, and the level of such engagement, by a user can then be tracked and reported to determine appropriate compensation for a publisher. If the user's engagement is more than just passing, such as resulting in the advertisement becoming active, then the advertiser would be provided with an even higher level of assurance and the publisher might be paid an even higher amount of money. The money paid could also be based on different types of engagement and/or the amount of time spent by the user engaging the advertisement. For example, the passage of a mouse over the interaction prompt 508 might be paid at the lowest rate, while allowing the countdown to get to "2" or "1", but short of letting the advertisement become active, could be paid at a higher rate. Allowing the advertisement to become active would generate an even higher rate. A user's emailing or otherwise sharing of an advertisement could result in different revenue, including the resulting stream of additional viewers to whom the advertisement was sent or shared with, which could be tracked by the advertisement. A click through by the user to the advertiser's website might be compensated even higher. Likewise, a single user that uses the "next advertisement" feature to view multiple advertisements from the same advertiser could be priced at a different rate.

In an embodiment, rather than pay on a per user basis, engagements for multiple users over some period of time could be aggregated, with fees being based on aggregation totals or even percentages, e.g., 10,000 users moused over without further engagement, 5,000 partially counted down through the interaction prompt, 1,000 allowed the advertisement to become active, 500 clicked through, etc. Thus, many different means of tracking and reporting user engagement is possible and many different compensation schemes accordingly can result.

This engagement-based compensation model is more trustworthy than pay per impression-based models because user intent and interest in the advertisement is not inferred or assumed based on the mere display of an ad, but rather from true engagement with the advertisement—engagement being defined herein as interaction that falls short of a clickthrough. Further enhancements to the model include certain technological measures that avoid or account for "engagement" fraud that could be caused by manual or automated methods that appear to indicate engagement when no actual engagement by a user has occurred.

Potentially fraudulent activity includes engagements from known suspicious IP addresses or browser user agents, unusual engagement levels from particular users, unusual ratios of engagement types, unusual amounts of time between engagement types, etc. For example, if a user starts a video and then one second later finishes that video, that activity is probably fraudulent. Likewise, if a particular IP address shows lots of mouse overs, but no video views, or 100% video views, fraud could also be suspected. When fraudulent activity is detected or suspected, the advertisement manager 225 could disable the advertisement so no further engagement is possible. Alternatively, if fraudulent engagement with an advertiser's advertisement is detected, any engagement accounting associated with that advertisement could be adjusted by the amount of fraud involved.

Likewise, the model could be further enhanced through the application of an advanced advertising marketplace that allows advertisers to bid on the amounts to be paid per engagement, measured engagement, different type of engagement, etc., in an auction environment. This type of advanced marketplace, when combined with the engagement model of an embodiment, would allow advertisers to reach certain targeted demographics or other targeted criteria (such as noted above) with much greater levels of assurance and reliability than present models make possible. Under this model, advertisers are only obligated to pay when a user interacts with the displayed advertisement—not upon the mere display of the advertisement alone.

An embodiment of the present invention comprises a fixed position advertisement positioned anywhere on a portion of a web page currently being viewed by a user on a web browser window. The advertisement is described as having a fixed position because the advertisement remains in a fixed position and in view even as the user scrolls the web page. It is typical for web pages to require scrolling in order to view the entire contents of a web page due to screen size limitations of devices. For example, only the top part of a web page may be within view when the user visits a web page, requiring the user to scroll down in order to view the rest of the web page. Traditional advertisements placed within such a webpage scroll with the page and are quickly lost from view. The fixed position advertisement is placed in a position within the current viewable portion of the webpage that remains in view of the user even as the user scrolls the web page in various directions.

In one embodiment, an advertisement could be made to stretch across the full width, or height, of a web browser window, with the position of the advertisement remaining fixed either at the top, bottom, left, or right side of the browser window, even as the browser window is scrolled up, down, left, and right along the web page. The advertisement could also stretch a fraction of the full width or a fraction of the full height of the web browser window.

The fixed position advertisement is not limited to top, bottom, left, and right sides of the web browser window. The advertisement could also be fixed to any position of the web browser window, such as the bottom left corner of the web browser window, to the left of the main menu of a web page, etc. The advertisement could also be fixed so as to effectively float at some intermediate position on the web page as the page is scrolled, not the top, bottom, left or right, but somewhere in between. As such, it might cover up content on the web page that scrolls under it, or the content could effectively flow around the advertisement so that no content is covered. In addition, the advertisement could have a fixed size which does not stretch to fit the width or height of the web browser window. For example, the advertisement could be diagonal, rectangular, circular, or other polygonal shape, with the actual size and shape depending on the content of the advertisement or the amount of free space available on the web page. Regardless of the position or size of the advertisement, the fixed position advertisement remains in view as the user scrolls the web page.

The fixed position advertisement is especially useful for web pages with large amounts of content, which force the user to scroll down a page in order to view all of the content or simply to find the content of interest to the user. This tends to be the case for blog pages, where each blog entry is appended to existing or previous blog entries. This often creates very long web pages that require substantial scrolling in order to view all of the web page's content in the browser window. However, the fixed position advertisement can also be advantageously used on a web page of any length and/or width, because it allows the advertisement to be exposed to the user for a longer period of time than for traditional advertisements. Traditional advertisements, statically placed at a particular location on the web page, can be easy to overlook and can quickly go out of a user's view as the user scrolls up or down (or left or right) to access various parts of the web page. The herein disclosed fixed position advertisement solves this problem by allowing the advertisement to remain in view as long as the user does not close the advertisement or the current web page.

In an embodiment, the fixed position advertisement would stretch the full width, or height, of the current HTML frame. For example, if a web page is displayed using two frames, with a first frame positioned on top of a second frame, the fixed position advertisement could be displayed only on the top frame. Alternatively, if the first frame corresponds to a third party website and the second frame corresponds to the current website, then the fixed position advertisement could be displayed on the second frame corresponding to the current website. As previously discussed, in embodiments the fixed position advertisement may stretch a fraction of the full width or the full height of the current HTML frame, or may have a fixed size and position, such as that bottom, left corner, that that does not stretch to fit the size of the web browser window or the current HTML frame.

In an embodiment, if the advertisement was fixed at the top or bottom of the browser window, then the advertisement would stretch the full width of the browser window and would have a height of 40 pixels. Alternatively, if the embodiment was fixed at the left or right side of the browser window, then the advertisement would stretch the full height of the browser window and would have a width of 40 pixels. While these dimensions appear to work well, these dimensions could be readily customized by the owner or administrator of the web page.

The fixed position advertisement may consist of advertisements with text, images, videos, animated advertisements, other types of advertisements, or a combination of all of these. Animated advertisements can include advertisements using technologies such as FLASH, SHOCKWAVE, SILVERLIGHT, an applet, other web browser plug-ins, etc.

In an embodiment, the fixed position advertisement would be an interactive advertisement including an interaction prompt, as previously discussed herein. For example, if a user visits a web page incorporating the herein disclosed fixed position advertisement and moves his or her mouse over the advertisement, a counter starting from a high number and decrementing by one every second, or some other predetermined time interval, can warn the user that the full advertisement will be deployed once the counter reaches zero (or some other predetermined number). The height of the fixed position advertisement will depend on the actual website and can be dynamically configured. Ideally the advertisement would fit one to two lines of text, images or image strips, or even a scaled version of an animation or video. The fixed position advertisement could also have a minimum size and a maximum size associated as default properties, forcing a minimum and a maximum size regardless of the properties of the website.

Figure 14:
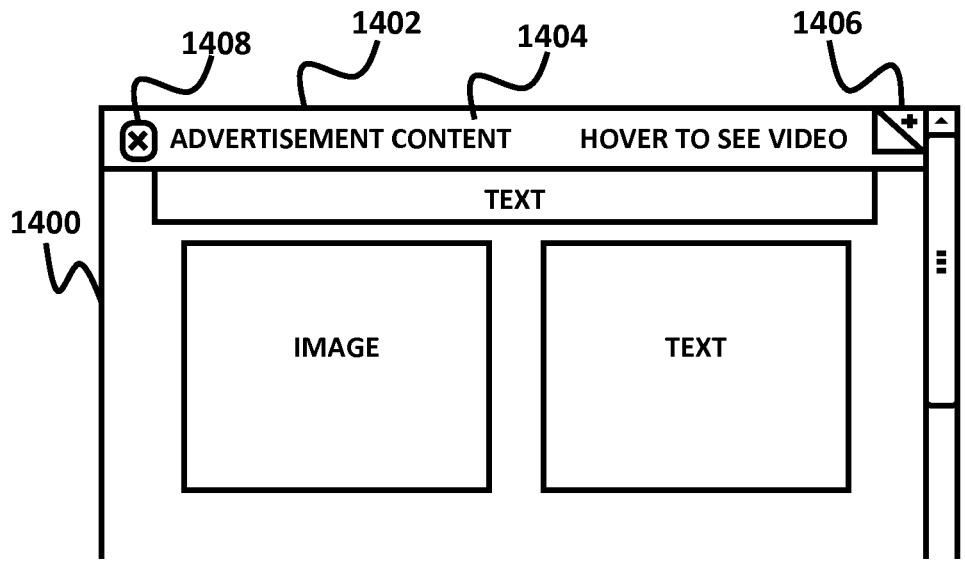
FIG. 14 illustrates an example web page with a fixed position advertisement unit located at the top of the browser window.

FIG. 14 illustrates a partial view of a browser window 1400 with the advertisement unit 1402 positioned at the top of the browser window 1400. The advertisement unit 1402 contains advertisement media content 1404, which can include text, an image, an image strip, a scaled video, or a combination of one or more of these elements. The advertisement unit 1402 could also include an interaction prompt 1406, with one of many possible engagement properties as previously discussed herein, located at the top right corner of the advertisement unit 1402. The advertisement unit 1402 could also include a button or widget 1408 allowing the user to close the advertisement unit. In an embodiment, the interaction prompt 1406 would be as illustrated in FIG. 5, comprised of a turned corner 510 and an engagement warning or indicator that includes a change symbol 512 as the warning device. The turned corner 510 makes the advertisement look as though it is made of paper and that the upper right hand corner has been bent forward as if to turn the page. The turned corner 510 gives the user the visual image that there is something else behind the advertisement that could be reached by interacting with the upper right hand corner. Other visual tools or devices, located anywhere, can also be used as the interaction prompt, such as a tab, a semi-transparent section that gives the user the ability to interact with the advertisement unit 1402 and which convey similar impressions as the turned corner.

Figure 15:
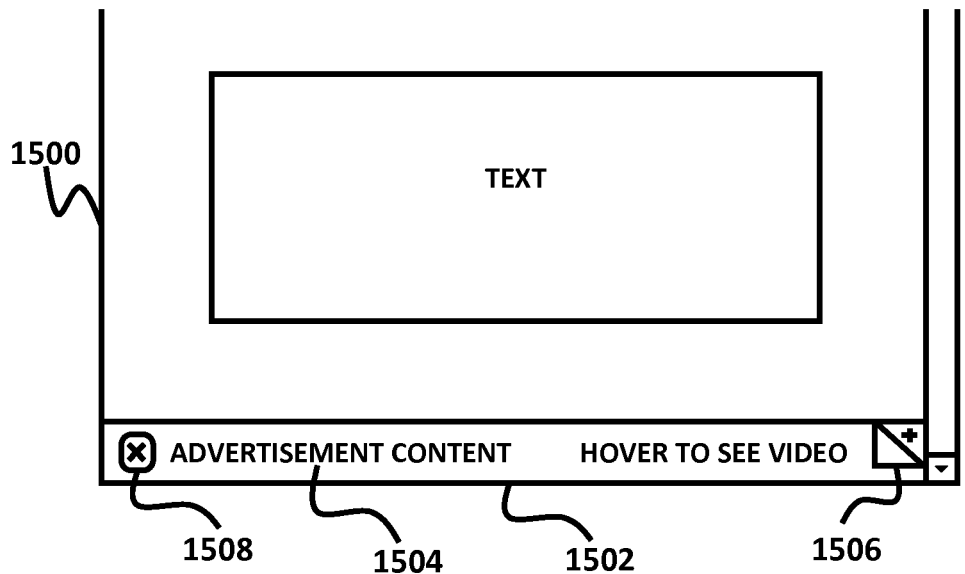
FIG. 15 illustrates an example web page with a fixed position advertisement unit located at the bottom of the browser window.
Figure 16:
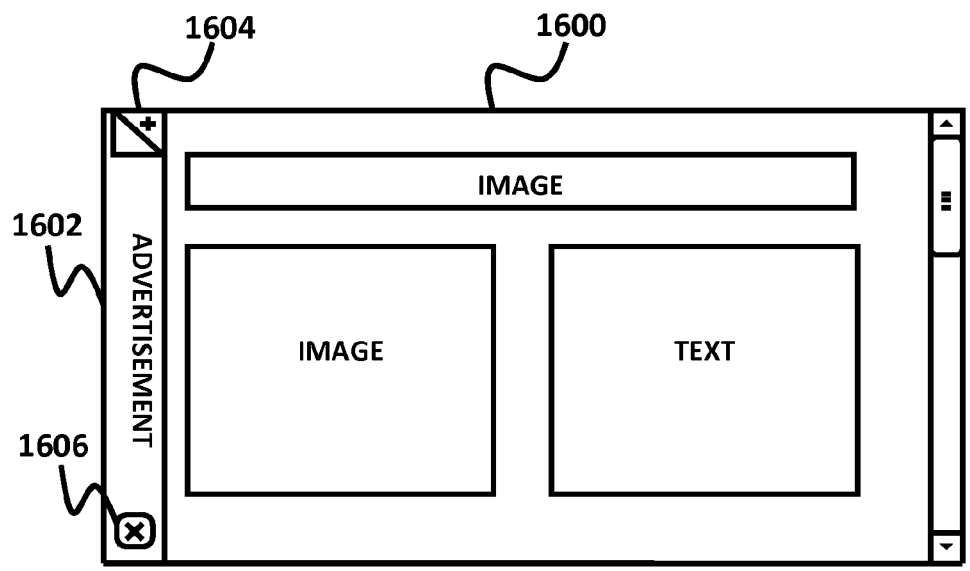
FIG. 16 illustrates an example web page with a fixed position advertisement unit located on the left side of the browser window.
Figure 17:
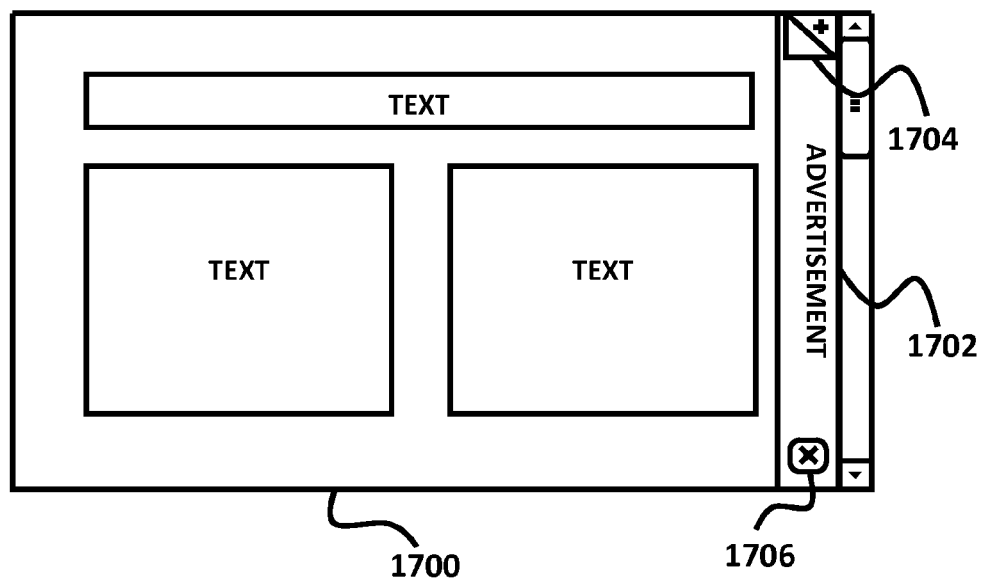
FIG. 17 illustrates an example web page with a fixed position advertisement unit located on the right side of the browser window.

FIG. 15 illustrates a partial view of a browser window 1500 where the advertisement unit 1502 is located at the bottom of the browser window. The advertisement unit 1502 would include advertisement media content 1504, the interaction prompt 1506, and the closing widget or button 1508. As the web page 1500 is scrolled, the advertisement unit 1502 remains fixed at the bottom of the browser window, stretching the full-width of the browser window. FIG. 16 illustrates another example of a browser window with the fixed position advertisement unit 1602 located on the left side of browser window 1600. In the case where the fixed position advertisement unit is placed vertically, the advertisement unit stretches along the full height of the portion of the web page visible in the browser window. The interaction prompt 1604 can be placed at the top of the vertically fixed advertisement unit 1602, but it can also be placed at the bottom. Similarly, the close button or widget 1606 can be placed at the bottom of the advertisement unit 1602, as illustrated in FIG. 16, or it can be placed at the top of the advertisement unit 1602. FIG. 17 illustrates yet another example browser window 1700, with the fixed advertisement unit 1702 placed on the right side of the browser window 1700, stretching the full height of the portion of web page 1700 visible in the browser window. The fixed position advertisement unit 1702 would include an interaction prompt 1704, and the closing button or widget 1706.

Figure 18:
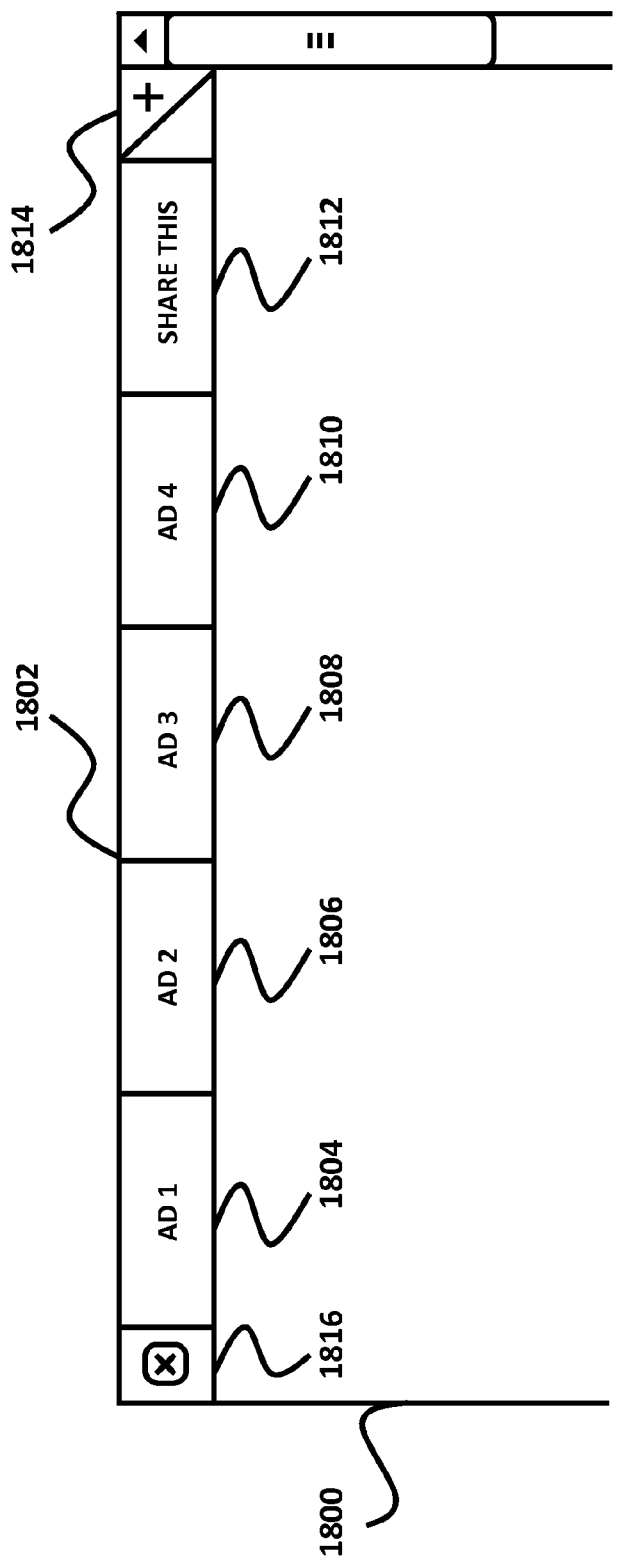
FIG. 18 illustrates an example web page with a fixed position advertisement unit, with the advertisement unit divided into one or more advertisements.

FIG. 18 illustrates an alternative embodiment, wherein the fixed position advertisement is divided horizontally into several advertisements, thus presenting the user with a strip of various advertisements. For example, the fixed position advertisement unit can be divided into four sections, allowing for four advertisements to be displayed side by side either along the top, bottom, left, or right side of the browser window, or any other position within the web page. The fixed position advertisement unit 1802 is shown at the top of the browser window 1800, but it could be placed at the bottom of the browser window, or on the left or right sides of the browser window. The fixed position advertisement unit 1802 contains four advertisements 1804, 1806, 1808, and 1810. These advertisements may be for different companies, or each may contain a different element of the same advertisement. For example, advertisement 1804 can contain a brand logo, advertisement 1806 can contain some text, advertisement 1808 can contain a running video, and advertisement 1810 can contain another image or text advertisement. The fixed advertisement unit may also contain a sharing link 1812 (or a sharing button 1812) for sharing the advertisement 1802, or for sharing the video in the advertisement unit 1802. For example, the advertisement unit 1802 could be advertising a movie, with one of the advertisement sections running a short trailer of the movie, such as advertisement section 1810. The sharing button 1812 allows the user to share the trailer with other users, by either allowing the user to enter an e-mail address to which the advertisement content or video can be forwarded, or allowing the user to save the advertisement locally on the user's computer.

While embodiments of the fixed position advertisement have been described in reference to FIGS. 14-18, it is intended that changes and modifications can be made to the described embodiments without departing from the true scope and spirit of the invention. For example, embodiments illustrated in FIGS. 14-18 may include the turned corner 510 on a different position, such as in the bottom left corner instead of being in the upper right corner, or may not include the turned corner 510 at all. Alternatively, a different interaction prompt may be used instead of the turned corner 510, etc.

In another embodiment, the fixed position advertisement can additionally act as a toolbar, allowing the user to perform actions such as saving the advertisement, sharing or forwarding the advertisement to another party, visiting the advertisement website, entering a comment regarding the advertisement, etc. In yet another embodiment, the user would be able to resize the advertisement unit. For example, the user may want to view the details of the advertisement in a larger mode, so the user can click and hold one of the corners of the fixed position advertisement, and move the mouse while holding the corner of the advertisement, dynamically scaling the size of the advertisement based on the user's mouse movement. Alternatively, the user could resize the advertisement to different dimensions. For example, the user can resize the shape of the fixed position advertisement so that it only spans half of the browser window, or another desired fraction of the total width or height of the browser window. In another embodiment, the fixed position advertisement would include a set of buttons that can allow the user to change the position of the advertisement. For example, the user can move the fixed position advertisement from the top of the browser window to the bottom of the browser window, or to the left or right of the browser window. Alternatively the user could select this option from a menu. This would be useful for websites which make use of fixed position toolbars at the top or bottom of the webpage to provide a set of functionality related to the website, such as FACEBOOK and MYSPACE. The position of the advertisement could also be determined based on whether it is detected at load time whether the current website already has a toolbar.

Having a fixed position advertisement on a website allows for the advertisement content to be visible in the user's browser window at all times, even as the user scrolls through a long web page or visits other sections of the website. In an embodiment, the fixed position of the advertisement can be determined based on usage patterns or demographic information about the user. Usage patterns may include a rate of interaction based on the browser window position of the fixed position advertisement. For example, a particular user may have a documented history of higher incidences of rates of interacting with advertisement prompts when fixed position advertisements are placed at the top of the browser window. Alternatively, if a certain demographic (for example, male users under 25 years of age) tend to interact at higher rates with fixed position advertisements when the advertisements are presented at the bottom of the browser window, then an advertisement would be positioned at the bottom of the webpage for users fitting that profile.

The fixed advertisement unit can be made to remain fixed at a position relative to the browser window by setting the "position" property of the fixed position advertisement. The position property can be set to have an absolute position which does not change when the user scrolls. Alternatively, the position of the advertisement can be updated dynamically as the user scrolls a web page.

An event handler can be associated with scrolling events in the case of updating dynamically the position of the fixed position advertisement, resulting in the event handler called whenever the user scrolled the web page. When called, the event handler can update the position of the fixed position advertisement based on the scrolling direction, the size of the display screen, the web page content, etc.

Such a dynamic update of the position of the fixed position advertisement based on user scrolling can also be used to give the appearance of web page elements flowing around the fixed position advertisement. For example, as the position of the fixed position advertisement is updated, the event handler can also check whether the fixed position advertisement overlaps other web page element based on their respective positions, sizes, and shapes. Methods for checking whether a plurality of elements overlap are well known in the art. If it was found that there was an overlap between the fixed position advertisement and a number of other web page elements, then the position of the other web elements could be updated accordingly based on the web page content. However, at times it may not be practical to update the positions of the other web page elements since such changes may completely change the layout or the look and feel of the webpage. An alternative solution may simply resize the other web page elements to avoid overlap with the fixed position advertisement. Yet another embodiment may update the position of the fixed position advertisement, regardless of whether it overlaps or covers any other web page elements as the user scrolls the web page.

Cascading style sheets (CSS), used to control the style and formatting of websites, can be used to specify the position of the advertisement unit by setting the position property of the fixed position advertisement unit to the "fixed" value. Other CSS properties can also be used to update position, size, look and formatting, and shape of the fixed position advertisement or of other elements in a web page. While several methods of implementing the fixed position advertisement have been described, alternative methods used to implement an advertisement which remains in a fixed position, and in view of the user, as the user scrolls the web page are encompassed in embodiments of the invention.

Another embodiment comprises a full-page video interstitial advertisement. The interstitial advertisement offers advertisers a high quality, full screen video distribution opportunity for a set period of time, such as a 15 second spot. The exact duration of the video may of course vary depending on the content of the video or the configuration of the website. A session manager controls the session exposure period of the interstitial advertisement to the user, to prevent the user from experiencing more than one interstitial advertisement for a set exposure period, such as every 30 minutes on the current web session. The time period or exposure period between the displays of interstitial advertisements shown to the user can also vary depending on the website and user activity.

A distinctive feature of the interstitial advertisement, once it has been selected and permitted to be displayed by the session manager, is that it would be displayed to the user either: (1) as the current webpage is loading; (2) once the webpage has completely loaded; or (3) as the user is exiting the webpage. The event that triggers the display of the interstitial advertisement is also configurable by the website. Such events can be based on user interactions, such as when a user clicks a link or button, when a user moves the mouse over a section of the webpage, or after the user has spent a number of seconds or minutes on the current webpage (i.e., a timer expiring). The display of the interstitial advertisement takes over the entire web browser window, providing a greater media value to the advertisers, versus just a small area of the web browser window. The web browser window will be used to refer to a web browser running in normal mode or in full screen mode, a FLASH application, an applet, or a rich internet application, such as ADOBE AIR, JAVAFX, MICROSOFT SILVERLIGHT, and CURL.

In the preferred embodiment of the interstitial advertisement herein disclosed, sound would be required in order to view the interstitial advertisement. Due to the short time span of the interstitial advertisement, the use of sound is critical to the media value of the advertisement. In an embodiment, the video in the interstitial advertisement would include closed captioning that would be displayed if it was detected that the user has sound disabled on the web browser or if sound was not supported on the user's computer.

A distinctive feature of the present interstitial advertisement is its usability and context awareness. Advertisements have become a negative experience to many users. Pop-up advertisements can be frustrating to the user, since they open additional unwanted windows that distract the user, and that can be disconcerting to users if displayed at unexpected times. Pop-up advertisements also tend to be designed with techniques meant to force users to acknowledge the advertisement, but such an approach makes them frustrating to users. For example, it is common to close a pop-up advertisement, and have this closing action trigger a second pop-up advertisement to show up. Numerous pop-up advertisements can eventually clutter a user's screen space, forcing the user to close everything or navigate away from the current webpage. Advertisements also tend to use display techniques that are jarring to the user visiting a webpage. Due to the proliferation of advertisements overwhelming users, such jarring effects have practically become required to gain the overwhelmed users' attention.

In contrast to the current approach to advertisements, the present interstitial advertisement delivers the advertisement content and media value by utilizing usability and context awareness to make presentation of the advertisement content a more positive user experience. For example, as the advertisement is being displayed, a short, initial or "build-in" animation or transition is displayed to convey to the user that the user is not being taken away from the requested webpage, but rather the requested webpage is being taken over for a short period of time to display the advertisement. This initial animation or transition softens the jarring nature of many interstitial advertisements that suddenly pop into view un-expectantly and cause the user to become confused about what happened or where their requested page went. By providing a short build-in animation or transition sequence, the user is able to see that something other than what they expected is coming and to ease them into the transition.

In addition, while the herein disclosed interstitial advertisement can be presented as a full-page video overlaid on top of the current webpage within the browser window, the overlay can be transparent so as to give the user the ability to see their requested page in the background. While the advertisement is displayed, they cannot access or click on the requested page, but they know it is there and they have not been taken somewhere they did not intend because they can still see the requested page in the background. When the interstitial advertisement is displayed on the full-page, the video can also be sized or configured to not cover the entire web page so the underlying page can be seen by the user. The video in the interstitial advertisement is also preferable centered on the webpage, but the video could be sized to allow the user to see edges of the webpage the user was visiting in the background.

Other arrangements are also contemplated that take advantage of the structure of the webpage and the interstitial advertisement so that the advertisement does not completely obscure the webpage why allowing the user to clearly see the advertisement. With each webpage, a different structure and display of the advertisement would be required. This contextual arrangement provides a less jarring experience, as the user is aware that he/she has not been taken to an unwanted website. Further, since the interstitial advertisement is not displayed on a separate window, the interstitial advertisement would still be displayed even if the user had pop-up windows blocked in his or her web browser preferences.

The herein disclosed interstitial advertisement can include a button or widget to allow the user to close the interstitial advertisement. In the preferred embodiment, a user is allowed to close the interstitial advertisement after a portion of the video in the interstitial advertisement has played. A minimum playing time may also be specified for the interstitial advertisement, ensuring that users are exposed to at least a portion of the video or up to a critical point of the video. A time bar, or fuse, at the top of the screen can also show the user the total length of the video advertisement, and the user's current viewing progress. The fuse would preferably change color from left to right, or from right to left, with the change in color progressively filling the fuse as the video playing progresses, although other advertisement time progression techniques could also be utilized. As with the build-in transition, a conclusion or "build-out" animation or transition can also be provided to ease the transition from the advertisement back to the requested webpage. For example, the advertisement could finish and switch back to the requested page or gradually fade while a small bar or remnant of the fuse is left on the screen, drawing the user's eye to the bar/fuse and inviting the user to interact with it one more time.

The interstitial advertisement can also be configured to allow the webpage owner or administrator to add a custom text message at the bottom of the video or display space. Such a message could allow the webpage owner/administrator to thank the visiting user for viewing the advertisement or it can also serve to inform the user that through the use of such interstitial advertisements the webpage content is provided free of charge. Naturally, many other messages could be used, with the content of the custom message being editable and configurable by the webpage owner/administrator.

At the end of the video in the interstitial advertisement, the user can be provided with further engagement options, such as by presenting an interactive advertisement or an interaction prompt as previously discussed herein. Such engagement options can include replaying the advertisement video, visiting a website to learn more about the advertised product, or sharing the advertisement video with one or more other users.

The fuse visually shows the progress of the video as a filling bar, such as changing in color or by showing an icon or other visual object moving from one end of the fuse to the opposite end. The fuse could also display the length of the video, or a message informing the user that the webpage session would resume after a few seconds. Other visual techniques for communicating progress in viewing a video of finite duration may be appreciated by those skilled in the art and may be appropriately utilized with the interstitial advertisement as herein disclosed.

In the preferred embodiment, the interstitial advertisement would be overlaid on top of the current webpage by using a transparent layer. This transparent layer would allow the user to see a frame of the interstitial video advertisement placed on top of the current webpage. If the interstitial advertisement is displayed immediately upon visiting the webpage, then the user is able to see the webpage continue to load in the background through the transparent layer. The transparent layer provides the user with context awareness, in contrast to existing interstitial advertisements which block the webpage and tend to redirect the user to different webpages to view the advertising content.

The relative transparency, or transparency value, of the transparent layer of the interstitial advertisement can also be set relative to the progress of the video in the interstitial advertisement. For example, the transparent layer could be set to a relatively dark or opaque presentation when the video starts, but slowly transition from this relatively dark/opaque look to a more light or clear presentation. Thus, allowing the user to see the current webpage content become clearer as the video nears completion further reassures the user that he/she will be able to return to the webpage once the video ends. The transparency of an HTML element, such as the transparent layer, can be set by using the opacity property of the HTML element. The opacity value is typically a number between 0 and 1, with a lower number making the element more transparent. Programming a webpage or advertisement displayed within a webpage to have a degree of transparency or varying degrees of transparency is well known in the art.

Existing interstitial advertisements are usually presented as separate webpages that a user must visit before getting to the actual webpage content. For example, a user might visit a webpage, and be immediately redirected to a second webpage presenting an advertisement. Typically these interstitial advertisements inform the user that the webpage is an advertisement, and provide options that allow the user to skip the advertisement in order to get to the actual webpage. The use of such advertisement can be confusing to users, who expected to see a particular webpage, and then find themselves redirected to a different webpage. Public awareness of phishing attacks and other malicious content such as spyware and adware might also make a user apprehensive of being redirected to a different website unexpectedly and without any consent from the user, and without providing the user with any contextual awareness of the existence of the webpage they wanted, or the time length or extent of the interstitial advertisement being displayed. The present interstitial video advertisement, implemented with the above described transparency fade, allows the user to see that he or she has not been redirected to a different webpage. The transparent layer and the takeover of the entire web browser window also gives the interstitial advertisement a softer appearance, making the interstitial advertisement look like it is part of the desired webpage, and not a separate window or pop-up.

The present interstitial advertisement takes control over the current webpage and forces an engagement with the user by having all user interaction be directed to the deployed interstitial advertisement, instead of being directed to the current webpage, while the video in the interstitial advertisement is playing. For example, if a user attempts to click on a link on the current webpage seen through the transparent layer, the user would not be able to click on the link. However, when the video ends, the user is allowed to regain control of the current webpage, without the state of the webpage being modified.

This differs from previously available interstitial advertisements that take the user to a different webpage and may return the user to the original webpage at the end of the interstitial advertisement, but the user may not be returned to the exact location the user was originally in. For example, a user might have scrolled to the middle of the webpage and identified an item or information of interest. Then the user is directed to a different webpage to see an advertisement, just to be returned to the webpage and have to go through the process of finding the information they had previously identified. This is especially the case for flash based webpages and webpages that use client-side scripting and asynchronous calls to navigate through the content of a webpage. These client-side actions are not recorded when a user is redirected to a different webpage to view an interstitial advertisement, thus the user's current location within the webpage is lost when the user is redirected to a different webpage. With the presently disclosed interstitial advertisement, the user is required to view the interstitial video, but the current state of the webpage is not modified.

As noted above, the session manager ensures that a user visiting a webpage does not experience more than one interstitial advertisement per exposure period, such as every 30 minutes. The session manager could be implemented in many different ways, such as through software code that keeps track of different types of advertisements (or just interstitial advertisements) that have been played to the user and that keeps track of the time since the last such advertisement was played. The session manager could be incorporated into a web browser, an advertising server or an advertisement manager. For example, the session manager could manage this information by using cookie based sessions, as is well known in the art. However, the frequency of the interstitial advertisements can be configured by the webpage owner/administrator. The content of the interstitial advertisements could be different every time an advertisement is displayed to the same user. Alternatively, a second advertisement related to the first displayed advertisement can be displayed based on whether the user engaged with the first interstitial advertisement.

The cookie set by the session manager stores the last time an interstitial advertisement was displayed to the user. However, the cookie may also store additional information such as how the user interacted with the interstitial advertisement, the user's IP address, how many times the user has visited the webpage, etc. This last time of display can be referred to as a display time. In the preferred embodiment of the advertisement, the user cookie would store the last time an interstitial advertisement was presented to the user per domain. For example, if a user was visiting the www.videoegg.com domain, then the cookie would store the last time an advertisement was displayed to the user anywhere in the domain. If the user navigated from the www.videoegg.com/home webpage to the www.videoegg.com/news webpage, then an advertisement would not be displayed until the end of the exposure period. However, if the user visited a webpage belonging to a different domain, such as www.example.com, within the exposure period, then an interstitial advertisement would be displayed to the user. The wait period between the display of advertisements could be configured by the webpage owner/administrator, such as changing the wait period from 30 minutes to an hour, or reducing the wait period to 15 minutes, or any other desired time interval.

In another embodiment, the cookie set by the session manager would store the last time an interstitial advertisement was presented to the user per IP address of the user. For example, if a household had one IP address assigned to it by their Internet Service Provider (ISP), then the cookie would store the last time an interstitial advertisement was displayed to any user of that IP address, within the 30 minute period.

Figure 19:
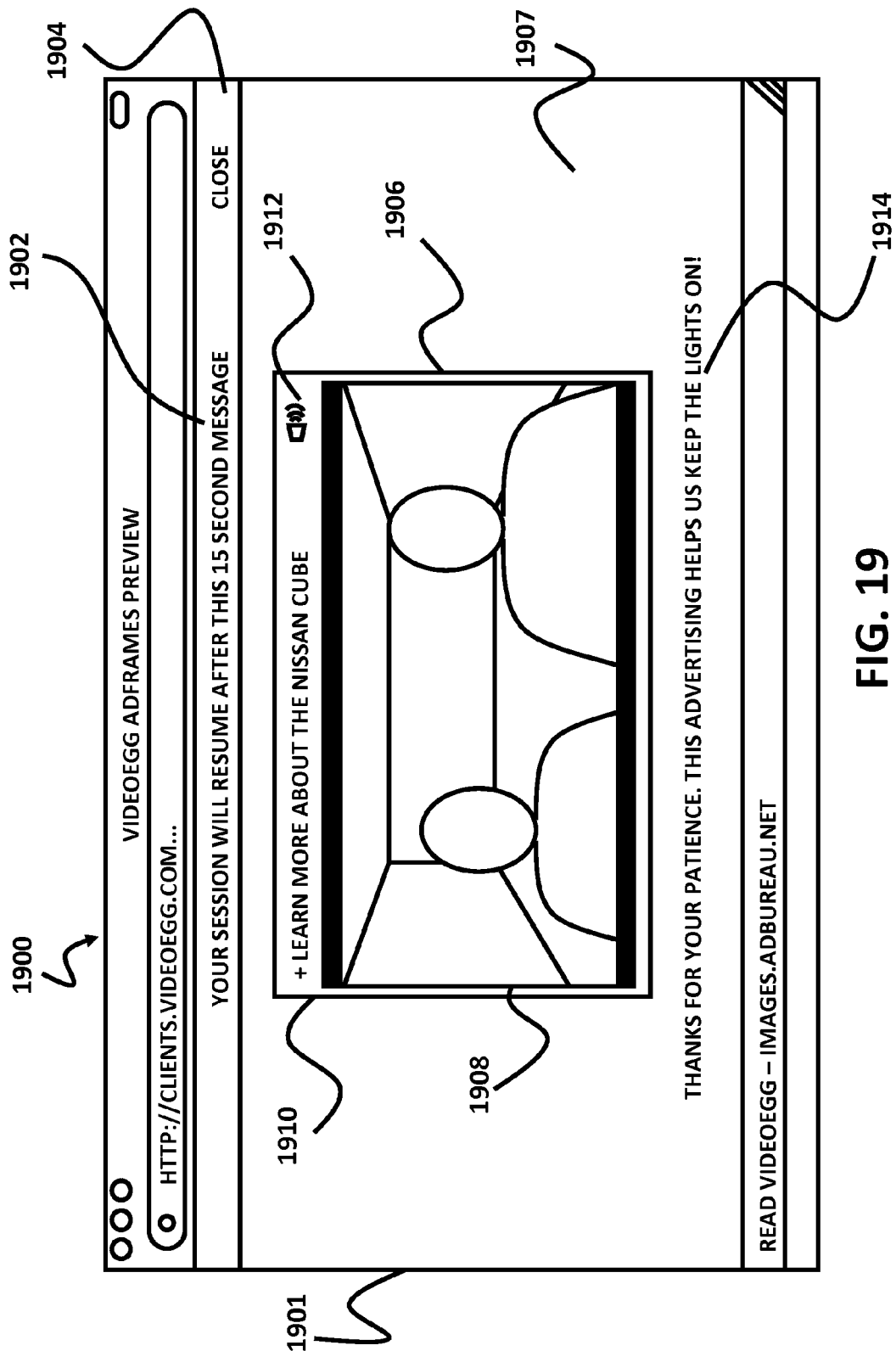
FIG. 19 illustrates an embodiment of a full-page video interstitial advertisement in accordance with an embodiment.

FIG. 19 shows an example of a full-page interstitial advertisement 1901 on a web browser 1900. The interstitial advertisement consists of the fuse 1902 at the top of the interstitial advertisement, a close button or widget 1904 allowing the user to close the interstitial advertisement after the user has viewed a portion of the video, and a video frame 1906 containing the advertisement content. Below the video frame 1906 and the bottom of the webpage 1907 the website owner can add a custom message 1914. The website owner can customize this message to inform users watching the interstitial advertisement that the use of such advertisements helps keep the content of the webpage 1907 free of charge to users. The video frame 1906 consists of a video 1908, an invitation 1910 that allows the user to view additional content related to the content presented in the video 1908, such as visiting a website related to the advertisement.

In FIG. 19, the invitation allows the user to learn more about the advertised item, such as the NISSAN CUBE automobile. The invitation 1910 can also include options for sharing the interstitial advertisement with other users. The video frame can also include a speaker 1912 button, widget, or icon that allows the user to adjust the sound of the video. The use of sound is critical to the media value of the full-page video interstitial advertisement. If a user has sound disabled, then the speaker 1912 can flash, or slowly grow in size, or move to the center of the video frame, forcing the user to adjust the sound or enable the sound for the current advertisement. If a user does not have speakers connected to the computing device being used by the user, then the speaker 1912 would be changed so that it is striked-through, visually informing the user that sound cannot be played. If the user has disabled the sound, turned down the volume, or cannot listen to sound because of the configuration of the computing device, then closed captioning would be enabled for the video.

In the preferred embodiment, the interstitial advertisement is full-page, but the video content plays within a smaller frame in the middle of the webpage 1907. Alternatively, the frame of the video can be made to be full-page as well. The advantage of playing the video on a smaller frame within the full-page interstitial advertisement is that it allows for the interstitial advertisement to be presented with contextual information since the user would still be able to see the current webpage 1907 behind the video because of the transparent layer.

An alternative embodiment combines the functionality of the fixed position advertisement with the full-page video interstitial advertisement. Rather than deploying the video interstitial advertisement over the entire page, the video interstitial advertisement can be deployed within a fixed position advertisement docked at the bottom of the page, the left side of the page, the right side of the page, the top of the page, or at some other fixed position. Deploying the video interstitial advertisement within the area of the fixed position advertisement results in a partial page takeover, rather than a full-page takeover. One of the advantages of such an embodiment is that the user does not lose control over the webpage while the interstitial video is playing. The partial-page takeover also gives users a high degree of control over the content displayed within the fixed position advertisement, including the ability to close the video interstitial advertisement at any point in time. The partial page takeover also provides benefits to the website hosting the advertisement. Since the advertisement does not completely cover the page, the website can be designed such that the site branding and main navigation are still visible while the advertisement is displaying. Consequently, the partial page takeover provides benefits to both users and the website owners. From hereinafter, the combination of the functionality of the fixed position advertisement and the partial page video interstitial advertisement shall be referred to as a "fixed multi-state advertisement".

In contrast to other types of advertisements, the combination of an interstitial video displayed within the boundaries of the fixed position advertisement, respects the user experience while providing high exposure of advertisement content. Some online advertisements have the reputation of being frustrating to users because they are distracting and often force users to view the advertisement material. While online users have grown accustomed to having many options available in terms of how they control their online experience, that tends not to be the case with online advertisements, which provide users with few choices. For example, most advertisements prevent users from continuing to browse a website while an advertisement is playing.

Similarly, video streaming websites, such as the YOU-TUBE website and the HULU website, force users to watch interstitial videos before users are able to view a particular desired video. In addition, it is common for video streaming websites to introduce interstitial videos over the duration of long videos, thus forcing users to view interstitial videos several times over the duration of a long video. Likewise, music streaming websites such as the PANDORA website stop the streaming music and force users to view or listen to an advertisement before the music streaming resumes. Such experiences are frustrating to users because users are forced to view the advertisements and cannot continue to use the primary function of the website until the end of the advertisement. For example, even though the PANDORA website does not take control of the website away from the user, it takes away the primary function or service it provides—music streaming, until the advertisement ends. Other advertisements also allow the user to remain in control of the website, but frustrate the users by displacing and moving parts of the website, making it difficult for users to continue to browse the website due to the constantly moving website content.

The fixed multi-state advertisement embodiment improves the user experience by leveraging a high degree of exposure to the advertisement content with a high degree of user control over the advertisement. All of the advertisement content is displayed within the boundary of the fixed multi-state advertisement. The fixed multi-state advertisement remains docked at a fixed position within the visible portion of the website within the browser window. This exposes the user to the advertisement content at all times, even as the user scrolls the website up, down, left, and right. In response to certain events, the dimensions of the fixed multi-state advertisement may change, but the advertisement content is confined to the dimensions of the fixed multi-state advertisement. This allows the user to remain in control of the website, it allows the user to continue browsing the website, and it allows the user to continue using the primary function or service provided by the website. Embodiments of the fixed multi-state advertisement provide the user with the option of closing the fixed multi-state advertisement. However, closing the fixed multi-state advertisement results in the advertisement being minimized and replaced by an additional interaction prompt, which allows the user to interact with the advertisement at a later time.

The fixed multi-state advertisement also provides several advantages to the website owner. The partial-page takeover allows for the website owner's own branding to remain visible when the video advertisement is deployed within the multi-state advertisement. For example, if the website branding is located at the top of the page, then the website owner can place the fixed multi-state advertisement at the bottom of the webpage so that the website branding is not covered when the video advertisement is deployed. This enables the user to know that they remain at the original website versus wondering whether they are being redirected to a different website playing the video advertisement. Similarly, if the website branding was located at the bottom of the page, or at some other position, then the fixed position interactive advertisement can be positioned at a different location within the webpage so that the website branding or other important content is not covered when the video interstitial advertisement deploys within the fixed position advertisement. The website owner can also position the fixed multi-state advertisement so that the website menu or other content remains visible. The partial-page takeover also prevents user confusion because the user never loses control of the website and the user can continue to interact with the website as any advertisement is displayed or played within the area of the fixed multi-state advertisement. The fixed multi-state advertisement defines a clear boundary that allows the user to differentiate between the advertisement and the website, thus preventing user confusion.

In an embodiment, the fixed multi-state advertisement is sized based on the size of the content being displayed within the fixed multi-state advertisement. For example, if an interstitial video is displayed within the fixed multi-state advertisement, then the size of the fixed multi-state advertisement can be set to the same size as the interstitial video. Either the width, the height, or both the width and the height of the fixed multi-state advertisement can be set equal to or based on the width and height of the interstitial video. For instance, a fixed multi-state advertisement including an interstitial video with a width of 320 pixels and a height of 240 pixels can be sized to a height of 240 pixels and a width expanding the width of the browser window.

Parameters can also be designed and set to maintain a certain distance, in pixels, as a percentage of the website, or based some other form of measurement, between the window of the website and the boundaries of the advertisement. For example, the boundaries of the multi-state advertisement can be set to remain 10 percent of the size of the website window, no matter how the size of the website window might be changed by the user. Likewise, a certain distance can be set between one or more boundaries of the advertisement and different sides of the browser window. For example, for a fixed multi-state advertisement positioned at the bottom of the visible portion of a website, the left boundary of the advertisement can be set a certain distance from the left side of the browser window, with similar distances being set for the top and right side of the advertisement and window, such that the distance of the advertisement on three sides relative to the same three sides of the browser window stay the same no matter how the browser window was sized. Similar parameters can also be set for the interstitial video displayed by the fixed multi-state advertisement relative to the browser window.

In an alternative embodiment, the content displayed within a fixed multi-state advertisement can be sized accordingly based on the dimensions of the multi-state advertisement, rather than sizing the multi-state advertisement based on the original size of the content or the size of the browser window. For example, if the fixed multi-state advertisement has a height of 100 pixels, then an interstitial video displayed within the fixed multi-state advertisement can be scaled accordingly to have a maximum height of 100 pixels. Alternatively, the video can be scaled up if necessary to ensure that the area within the fixed multi-state advertisement is not wasted.

In an embodiment, the size and dimensions of the fixed multi-state advertisement are updated dynamically based on one or more events or based on the content being displayed. For example, the fixed multi-state advertisement may initially have dimensions consisting of a first width and a first height, with the dimensions changing from the first width and the first height to a second width and a second height when the user clicks the fixed multi-state advertisement with the mouse, when the user hovers the mouse over the advertisement, when the user clicks anywhere on the website, when the user presses a key from the keyboard, or based on some other user interaction or event.

Alternatively, the dimensions of the fixed multi-state advertisement may change in response to a timer. For example, the fixed position advertisement may have an initial width and an initial height, with the initial height expanding at least half the height of the visible portion of the current webpage. After a few seconds or a few minutes, the height of the fixed multi-state advertisement can change to a height that only expands a small fraction of the webpage. This would allow for balanced exposure of the advertisement material to the user, with a high exposure of the advertisement material when the webpage is initially loaded, but with a less intrusive display of the advertisement after a period of time. The timer may also be associated with an interstitial video playing within the fixed multi-state advertisement, with the end of the interstitial video triggering a resize of the fixed multi-state advertisement.

In an embodiment, the content displayed within the fixed multi-state advertisement can change based on certain events. The fixed multi-state advertisement can initially display an interstitial video. Once the interstitial video ends, the content of the fixed multi-state advertisement can change to a static text block, a static image, a flash animation, or to some other interactive content which encourages further interaction from the user. The changes in the content displayed within the fixed multi-state advertisement can depend on a number of factors. The changes in content can range from minor changes to the content displayed to major changes that drastically alter the manner in which the user interacts with the advertisement content. For instance, the fixed multi-state advertisement can initially display only text and images, with the advertisement content subsequently changing to only text. The event that triggers the change can be a mouse event, a keyboard event, a timer event, or a combination of two or more events. The interstitial video or content displayed within the fixed multi-state advertisement need not be deployed as soon as the webpage loads. The interstitial video can be configured to deploy a few seconds after the webpage loads, or after the user has interacted with the webpage.

The overall state and appearance of the fixed multi-state advertisement can also change based on certain events. An embodiment of the fixed multi-state advertisement consists of at least two states: a billboard state and a navigation state. From herein, the content displayed, the dimensions, and the appearance of the fixed multi-state advertisement during the billboard state will be referred to as "the billboard." Similarly, the content displayed, the dimensions, and the appearance of the fixed multi-state advertisement during the navigation state will be referred to as "the navigation bar."

Embodiments of the billboard consist of an advertisement message, either static or animated, that is interactive or non-interactive. An interactive billboard can display an interaction prompt in response to the user clicking the billboard, moving the mouse over the billboard, or some other event. The user interacting with the interaction prompt can subsequently trigger a change in the content of the billboard, a change in the appearance of the billboard, or a change in both the content and the appearance of the billboard. The user interacting with the billboard can also result in the user being redirected to a website associated with the advertisement.

A non-interactive billboard can display a static or animated advertisement that does not change or does not redirect the user to a different webpage when the user attempts to interact with the billboard. For example, a non-interactive billboard can be useful while an interstitial video plays. In this case, the non-interactive billboard can reinforce the advertisement message of the interstitial video and prevent the user from accidentally being redirected to a different website while the interstitial video plays.

The navigation bar consists of an interactive advertisement that encourages user engagement in a variety of ways. In embodiments, engagement with the navigation bar triggers different types of content to be displayed to the user within the fixed multi-state advertisement, without the need to redirect the user to a different website without the user's permission. Hence, the navigation bar makes an advertisement highly interactive by encouraging engagement from the user in a variety of ways. In addition, the navigation bar respects the user experience by allowing the user to remain on the current website, even while interacting with the advertisement. For example, the navigation bar can behave similarly to a menu bar, with the different menu options displaying different types of content or engaging the user in different ways. In alternative embodiments, the navigation bar can include triggers that deploy content within the fixed multi-state advertisement and triggers that redirect the user to a different website.

Figure 20A:
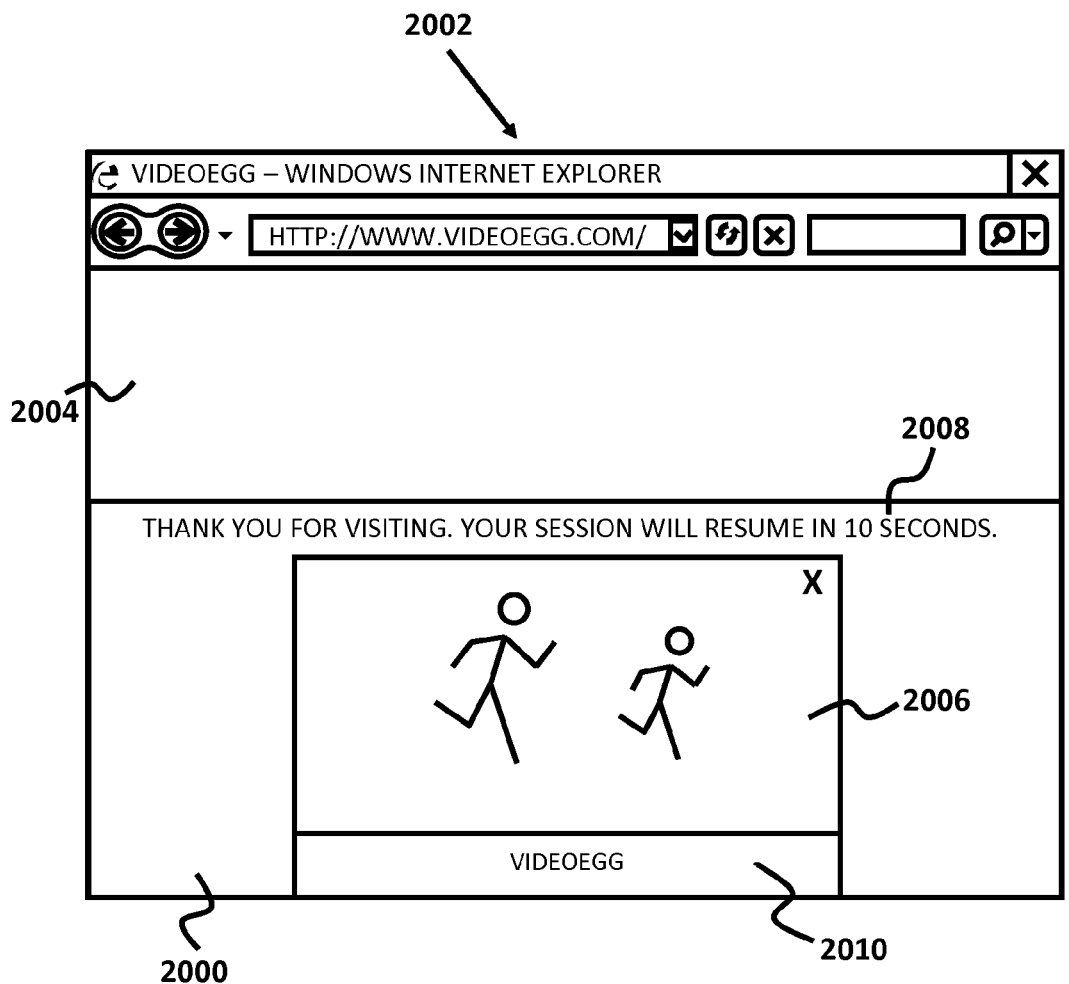
FIG. 20A illustrates an embodiment of the fixed multi-state advertisement on a web browser during the billboard state.

FIG. 20A illustrates an embodiment of the fixed multi-state advertisement 2000 on a web browser 2002 during the navigation state. The fixed multi-state advertisement 2000 expands to cover about half of the webpage 2004 being displayed on the web browser 2002. A screen 2006 is displayed within the fixed position advertisement 2000. The screen 2006 can display a video, an animation, or static content such as text and images. While the advertisement 2000 covers about half of the webpage 2004, the height of the advertisement 2000 can be adjusted accordingly based on the size of the screen 2006, the content of the webpage 2004, the preferences of the website owner, and the preferences of the advertisement owner. What is important is to ensure that the advertisement 2000 only covers a part of the webpage 2004, so that the website brand is not covered and to prevent user confusion as to what webpage the user is actually visiting.

The height of the advertisement 2000 can range from covering half of the webpage 2004, to a quarter of the webpage 2004, to two-thirds of the webpage 2004, or to any other desired height value. The height of the advertisement 2000 can also be specified as a value in a number range, with the number range specifying the range of possible values that can be used for the dimensions of the advertisement. For example, if using a number range such as 0 to 100, then the number 0 can indicate the minimum height and 100 can indicate the maximum height that can be used for the height of the advertisement 2000. The width and the height of the advertisement 2000 can be adjusted accordingly depending on the state of the advertisement 2000, so that a first width is used during the billboard state and a second width is used during the navigation state. The shape of the advertisement 2000 can also be something other than a rectangle, including circles, ellipses, polygons, or a freeform shape. From herein, the dimensions of the advertisement 2000 associated with the billboard state will be referred to as "billboard dimensions" or "expanded dimensions." The dimensions of the advertisement 2000 associated with the navigation state will be referred to as "navigation dimensions." The billboard dimensions or expanded dimensions include the dimensions of the advertisement 2000 when content is displayed in response to the user interacting with the navigation bar.

The partial-page takeover associated with the billboard dimensions or expanded dimensions is less aggressive than a full-page interstitial video, since (1) the user remains in control of the website even as content is displayed within the screen 2006, and (2) the user has the option to close the screen 2006. If a video, or interstitial video, is playing within the screen 2006, then the fixed position advertisement can include a message 2008 that can be used to inform visiting users of the total length of the video, the remaining time of the video, or any other message the owner of the website or the owner of the advertisement may be interested in presenting to the visiting user. The message 2008 can also be a time bar, a progress bar, or fuse, showing the viewing progress as described above.

The fixed multi-state advertisement 2000 includes a billboard 2010. As described above, the billboard 2010 can include a static message or an animated message that is either interactive or non-interactive. The billboard 2010 can display a message, it can redirect the user to a different website when the user interacts with the billboard, it can restart the video playing in screen 2006, it can change the video playing in screen 2006, or it can execute or perform any other action that is conducive to the message of the advertiser. In FIG. 20A, the billboard includes the message "VIDEOEGG", but this message can be customized as desired by the website owner or by the advertisement owner to present a message that supplements and reinforces the overall advertisement message and the interstitial video. In addition, while the billboard 2010 has a width that only spans a portion of the advertisement 2000, alternative embodiments can span the entire width of the advertisement 2000. Likewise, the width of the advertisement 2000 is shown spanning the width of the webpage 2004, but it could be less wide than the webpage or even larger than the webpage.

Embodiments of the fixed multi-state advertisement 2000 can be overlaid on top of the current webpage 2004 by using a transparent layer. This transparent layer would allow the user to see a frame of the advertisement 2000 placed on top of the current webpage 2004. The use of a transparent layer provides the user with an additional level of context awareness. Alternative embodiments of the fixed multi-state advertisement 2000 can have a non-transparent background.

If a transparent layer is used for the advertisement 2000, the relative transparency, or transparency value, of the transparent layer can also be set relative to the progress of the video displayed within screen 2006. For example, the transparent layer could be set to a relatively dark or opaque presentation when the video starts, but slowly transition from this relatively dark/opaque look to a more light or clear presentation. Thus, allowing the user to see the current webpage 2004 content become clearer as the video nears completion, thereby further reassuring the user that he/she will be able to return to the webpage once the video ends. Programming a webpage or advertisement displayed within a webpage to have a degree of transparency is well known in the art.

Figure 20B:
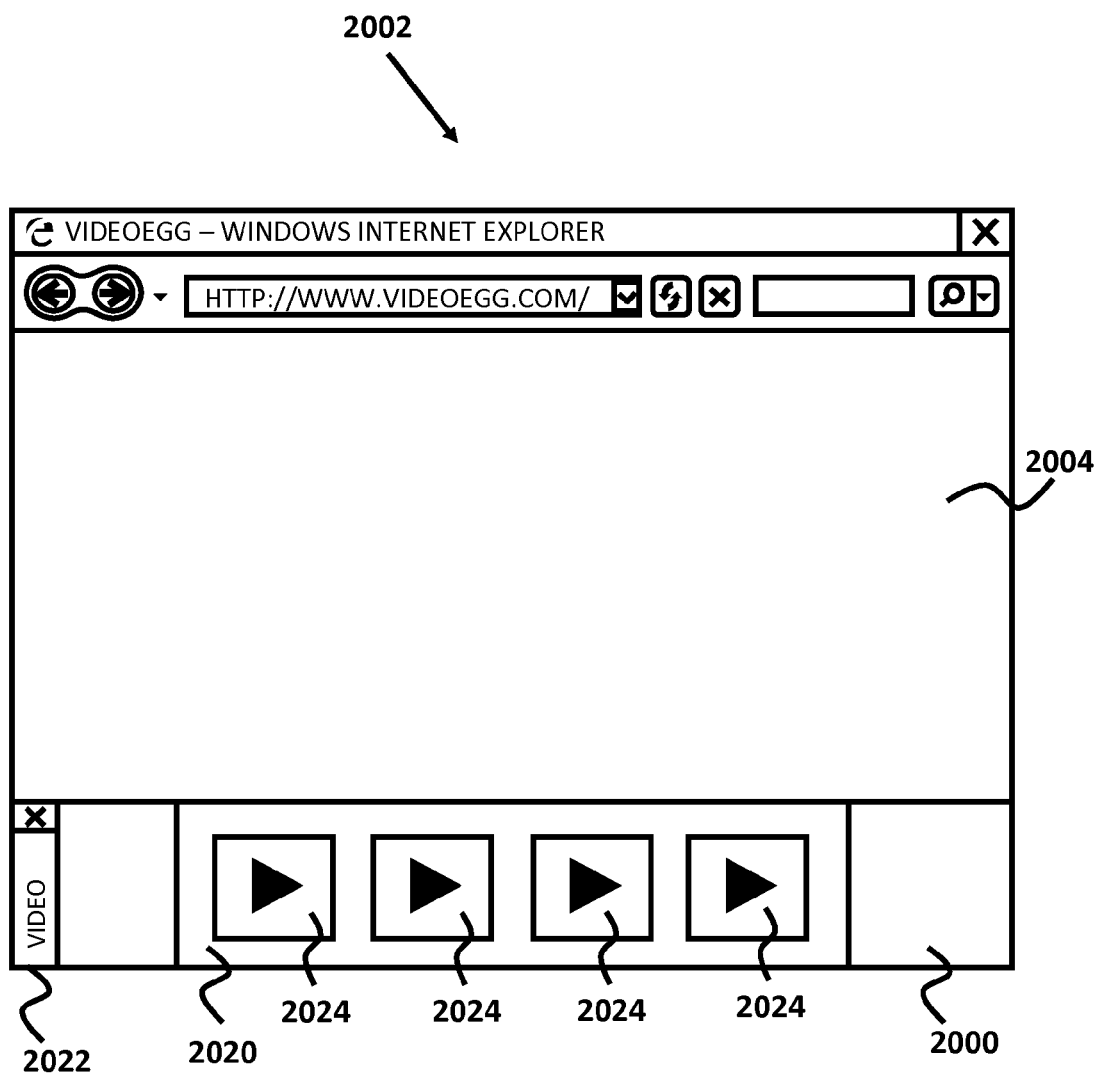
FIG. 20B illustrates an embodiment of the fixed multi-state advertisement on a web browser during the navigation state.

FIG. 20B illustrates the fixed multi-state advertisement 2000 after its state changes from the billboard state, illustrated in FIG. 20A, to the navigation state. The change from the billboard state to the navigation state triggers a number of changes. In the particular embodiment illustrated in FIGS. 20A and 20B, the screen 2006 and the billboard 2010 are replaced by the navigation bar 2020 and the close tab 2022. In addition, the size of the advertisement 2000 is changed from the billboard dimensions to the navigation dimensions.

The navigation bar 2020 includes interaction prompts 2024 that allow the user to view advertisement content deployed within the area of the fixed position advertisement 2000. For example, interacting with one of the interaction prompts 2024 can display additional content on a separate website, or may cause the fixed multi-state advertisement 2000 to expand from the navigation dimensions to the expanded dimensions in order to display a static message, an animated message, or some other type of advertisement content. The interaction prompts 2024 can also trigger the fixed multi-state advertisement 2000 to expand and the screen 2006 to deploy. Once deployed, the screen 2006 can play a video, an animation, or a static image associated with the interaction prompt 2024 selected by the user. Hence, the navigation bar 2020 allows a user to explore advertisement content similar to how users browse websites, while staying within the webpage 2004.

The content played in response to the user interacting with the interaction prompts 2024 plays for a limited time and provides a way for the user to close or dismiss the content in order to avoid overwhelming or frustrating the user. In embodiments, any content displayed within the fixed multi-state advertisement, in response to user interactions with interaction prompts 2024, remains in view until the user manually closes the displayed content. Any displayed content may also be automatically dismissed as discussed below. For example, if the screen 2006 is deployed in response to the user interacting with the navigation bar, then the user can manually close the screen 2006. The fixed multi-state advertisement can also include a close button (not shown) that closes all of the displayed content and further restores the size of the advertisement 2000 to the navigation dimensions.

In alternative embodiments the fixed multi-state advertisement may automatically close any advertisement content displayed in response to user interactions with interaction prompts 2024. For example, if the screen 2006 is deployed in response to the user moving the mouse over one of the interaction prompts 2024, then the screen 2006 can close after the video, or other content, displayed within the screen 2006 ends. Alternatively, the screen 2006 can automatically close based on a timer or some other event. Regardless of whether the content, displayed in response to interaction with the interaction prompts 2024, is closed manually or automatically, it is important for the dimensions of the fixed multi-state advertisement to be restored to the navigation dimensions. The navigation dimensions, as shown in FIG. 20B, result in only the navigation bar 2020 being displayed. The relatively small size of the navigation bar also makes it less obtrusive.

In yet another embodiment, the content displayed in response to user interactions with the interaction prompts 2024 may be displayed within the navigation dimensions, without deploying the screen 2006 or changing the dimensions of the navigation bar 2020. For example, the advertisement content can be displayed on a separate layer on top of the navigation bar, with the separate layer not being any bigger than the navigation bar. Alternatively, the navigation bar may slide off the bottom of the web browser, with the advertisement content associated with the interaction prompt 2024 sliding into the web browser screen in place of the navigation bar. Other visual effects and transitions can be used to increase the visual appeal of the advertisement content.

Figure 20C:
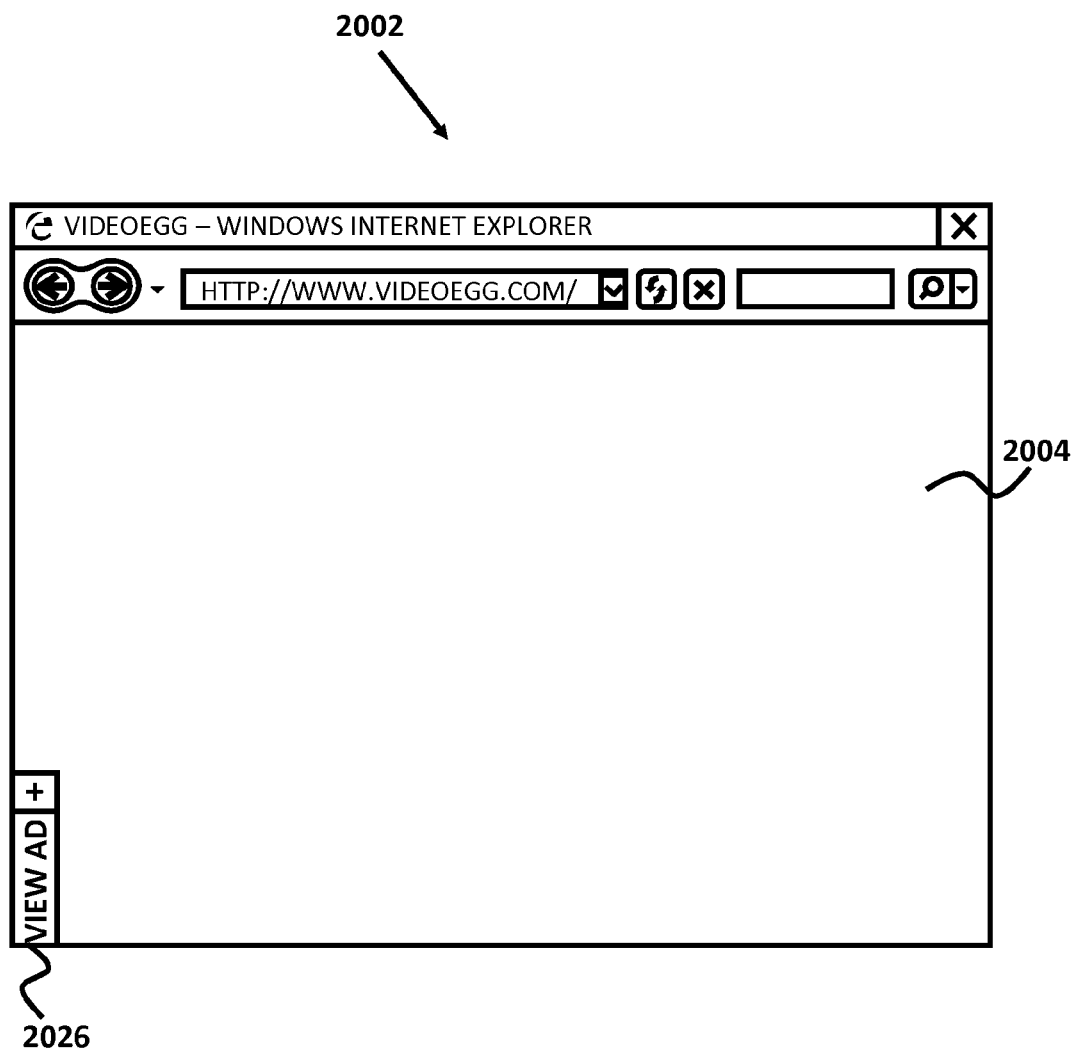
FIG. 20C illustrates an embodiment of an open tab representing a minimized fixed multi-state advertisement on a web browser.

Interacting with the close tab 2022 causes the fixed multi-state advertisement 2000 to close. However, in contrast to commonly used embodiments, as illustrated in FIG. 20C, the close tab 2022 would transform into at least an open tab 2026, which would persist after the advertisement 2000 had been closed. The open tab 2026 would allow a user to view the advertisement 2000 by expanding the fixed position advertisement 2000 to the billboard dimensions, the navigation dimensions, or to some other dimensions. Reopening the advertisement 2000 with the open tab 2026 can open the advertisement in the navigation state, the billboard state, or some other state.

The combination of the video interstitial advertisement deployed within a fixed position advertisement, where the fixed position advertisement includes at least the billboard and navigation states, leverages a high exposure of advertisement material and a high degree of user control over the advertisement. In an embodiment, a video displayed within a screen 2006 is displayed to the user when the website initially loads, after a predetermined period of time, or after the user has interacted with the webpage 2004. The screen 2006 is deployed within the fixed multi-state advertisement 2000, with the advertisement 2000 sized so as to only cover a portion of the webpage 2004. For example, the advertisement content may be related to a concert series by various artists. In such an example, the initial video displayed in screen 2006 may present the user with an overall introduction to the concerts being played, important dates, etc. The initial video allows for a high exposure of advertisement content to the user. However, having a long video can frustrate the user. Hence, the combination of the fixed position advertisement and the interstitial video can balance how the advertisement material is presented to the user. For example, the initial video can be designed to present the user with enough content that will entice the user's interest and which will compel the user to interact with the navigation bar 2020 after the video ends and the screen 2006 closes.

In the example of the concert series, the introductory video can present the user with a short description of the artists involved in the concert series. The billboard 2010 can include the name of the overall concert series, or other material, which when selected redirects the user to the concert series website. Alternatively, the billboard 2010 can simply display a non-interactive advertisement message. After the video ends and the screen 2006 closes, the state of the fixed multi-state advertisement 2000 would change from the billboard state to the navigation state. This would cause the billboard 2010 to close or slide away, with the billboard 2010 subsequently being replaced by the navigation bar 2020. Each of the interaction prompts 2024 may then include information associated with each artist participating in the concert series.

The close tab 2022 and the open tab 2026 provide yet another layer of user control over the fixed position advertisement. The fixed multi-state advertisement allows for advertisement material to always remain in view of the user as the user scrolls a webpage in different directions. This is especially useful in certain websites with long form content, such as for blogs, among others, where the user can scroll for a very long time before reaching the bottom of a page. However, there may be times when the user may want to close the advertisement due to the advertisement being too distracting, covering too much screen space, or blocking a part of the webpage. In this case, having the ability to close the fixed multi-state advertisement gives the user a high level of control over the exposure to the advertisement material. However, in contrast to other advertisements, where once the advertisement has been closed it disappears and cannot be restarted, the open tab 2026 remains in view after the user has closed the fixed multi-state advertisement, allowing the user to restore the advertisement at a later time. For instance, after having explored the various options provided by the navigation bar 2020, the user may choose to close the advertisement in order to explore the website without any further interruptions or distractions. However, the user has the option of reopening the advertisement at a later time if the user chooses to.

Allowing the user to reopen the navigation bar also provides another data point that can be analyzed by the website owner, the advertiser, marketing firms, and designers of advertisement tools, to provide insight into how users interact with a particular advertisement. Data associated with the close tab and open tab can include the number of actions performed before the advertisement was closed, the number of actions performed after the advertisement was reopened, etc.

The open tab 2026 can include an interaction prompt which encourages the user to select the open tab 2026, thus compelling the user to reopen the advertisement. For example, after a period of time, the open tab 2026 may glow, or slowly grow in size, or change color, change shape, or become animated in some other way, enticing the interest and curiosity of the user.

Embodiments of the close tab 2022 and open tab 2026 are not limited to a vertically-oriented tab. Alternative embodiments can consist of a horizontally-oriented tab, or can consist of different shapes or icons. For example, the close tab 2022 can consist of a push button or an advertisement logo. Similarly, the open tab 2026 can consist of various shapes that can be static or animated. For example, the open tab 2026 can be a star-shaped button or widget, which spins in place at an increasing rate the longer the user ignores the open tab 2026.

In alternative embodiments, the content of the fixed position advertisement and navigation bar 2020 may change every time the user closes and opens the fixed multi-state advertisement 2000. For example, if the user does decide to interact with the open tab 2026 in order to deploy the navigation bar 2020, the navigation bar 2020 can display a different advertisement, or different content related to the advertisement initially displayed. While embodiments can display the same content every time the fixed position advertisement is reopened, having different types of content displayed would encourage the user to interact with the new advertising content and to reopen a fixed multi-state advertisement in future visits to the same or other websites.

As discussed above, in embodiments when a user engages or interacts with the displayed advertisement, such as by moving the cursor over an advertisement unit or an interaction prompt, the advertiser is assured that the user has seen the advertisement and paid some attention to it. Any act of engagement by a user, and the level of such engagement, can then be tracked and reported to determine appropriate compensation for a publisher. In an embodiment, an advertiser pays a publisher when an interstitial video is played when the website initially loads or when the interstitial video plays after a predetermined period of time. The compensation can be based on how long the interstitial is allowed to play. For example, a publisher can receive full compensation for every interstitial video that plays in its entirety, whereas the publisher can receive a fraction of the full compensation based on how long the interstitial video played before it was closed. In an embodiment, the compensation for the interstitial video is set up in stages. For example, if the video plays for less than 20% of the actual running time of the video, then the publisher does not receive any compensation. If the video plays between 20% and 50%, then the publisher receives a half of the full compensation. Finally, if the video plays at least 50%, then the publisher receives full compensation. The compensation levels and amounts can be varied accordingly between the publisher and the advertiser.

Embodiments of the fixed multi-state advertisement provide a greater value to the advertiser compared to traditional interstitial advertisements. In an embodiment, the advertiser pays the publisher only for the user engaging and viewing the initial interstitial video. All of the other user engagements, including the billboard and the navigation bar can add value to the advertiser without costing extra to the advertiser. In alternative embodiments, the publisher receives compensation every time an interstitial video is played within the fixed multi-state advertisement in response to the user interacting with interaction prompts 2024.

In an embodiment, rather than pay for playing an interstitial video, engagements with the billboard and the navigation bar could be aggregated for a user, with fees being based on aggregation totals or percentages. For example, if the user interacts with two out of four interaction prompts in the navigation bar, then the publisher can be compensated a first amount. On the other hand, if the user interacts with all of the interaction prompts, then the publisher can be compensated a second amount that doubles the first amount or that is proportional to the first amount. In this case, the interstitial video adds value to the fees being paid by the publisher. Alternatively, different levels of compensation can be associated with the different states of the fixed multi-state advertisement. A first fee can be paid to the publisher if the user interacts with the fixed multi-state advertisement during a first state (such as the billboard state), and a second fee can be paid to the publisher if the user interacts with the fixed multi-state advertisement during a second state (such as the navigation state), etc.

The close tab and open tab also add to the overall value being paid by the publisher, since an object or icon associated with the advertiser always persists and remains in view of the user. The fixed multi-state advertisement and the fixed position advertisement also offer a greater value to advertisers in that they remain in view of the user even as the user scrolls the webpage in various directions.

Figure 20D:
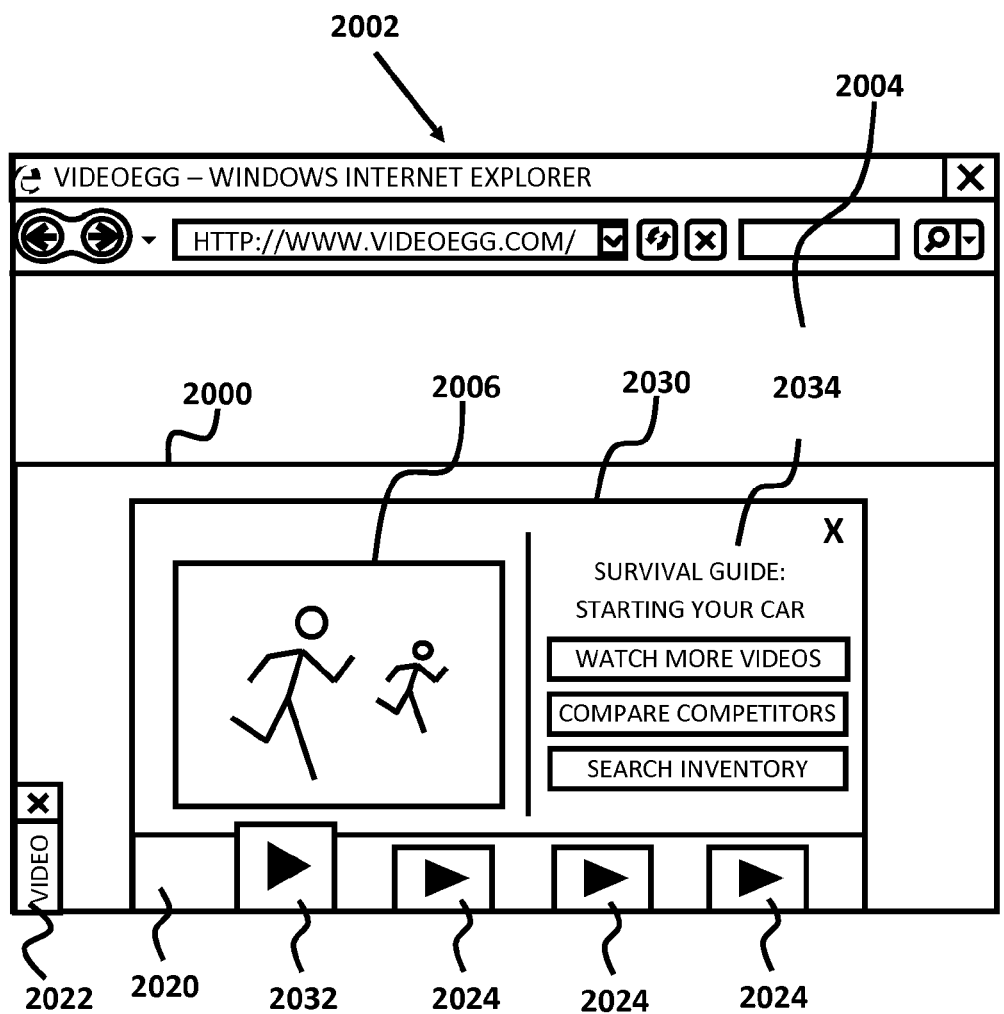
FIG. 20D illustrates an embodiment of the fixed multi-state advertisement after the user has interacted with one of the interaction prompts.

FIG. 20D illustrates an embodiment of the fixed multi-state advertisement 2000 after the user has interacted with one of the interaction prompts 2024. In particular, FIG. 20D illustrates a frame or display panel 2030 displayed within the area of the advertisement 2000 in response to the user interacting with interaction prompt 2032. The interaction prompt 2032 is enlarged in order to illustrate that the interaction prompt 2032 was selected and that the user is viewing content associated with said interaction prompt 2032. The interaction prompt 2032 need not be enlarged. In alternative embodiments, the selected interaction prompt can be illustrated as being currently selected by changing its background color, its border color, reducing the size of the interaction prompt 2032, animating the interaction prompt 2032, changing the text or image displayed within the interaction prompt 2032, displaying a special icon or image on top of the interaction prompt 2032, etc. Once the user closes the display panel 2030, the interaction prompt 2032 can return to its original appearance. Alternatively, the interaction prompt 2032 may return to its original appearance after a period of time. The interaction prompt 2032 can also be changed permanently, thus helping the user keep track of which of the interaction prompts 2024 the user has interacted with.

The display panel 2030 includes the screen 2006, as well as menu options 2034 that allow the user to explore additional content. In alternative embodiments, the display panel 2030 may only display the screen 2006. Alternatively, the display panel 2030 may only display menu options 2034. The ability to explore additional content by browsing the menu options 2034, or by interacting with the various interaction prompts 2024, allows the user to find advertising material which may be relevant to the user. For example, even if the interstitial video displayed within screen 2006 does not appeal to the user, the various menu options 2034 and the interaction prompts 2024 can contain alternative content which might spark the interest of the user. The entire fixed multi-state advertisement also allows the publisher to create a storyline that can engage the user along various points of the story. The engagement also provides the publisher with more opportunities to make an emotional connection with the user and increase the likelihood that the user will remember the advertisement material presented.

Embodiments of the fixed multi-state advertisement 2000 comprise of the initial deployment of an interstitial video within screen 2006, followed by the advertisement in the navigation state 2020 docked at a position on the web browser screen that remains in view as the user scrolls the webpage, and finally the screen 2006 and the display panel 2030 expanded and displayed in response to the user interacting with one of the interaction prompts 2024 of the fixed multi-state advertisement. However, embodiments are not limited to a fixed multi-state advertisement consisting of all of these components presented in the described manner. For example, an alternative embodiment can omit the initial deployment of the interstitial video. Alternatively, the interstitial video may be displayed as the user leaves the webpage, when the user closes the fixed multi-state advertisement, when the user reopens the fixed multi-state advertisement, or when the user interacts with the advertisement while it is docked on the web browser window.

Embodiments of the fixed multi-state advertisement can function with or without sound. While having sound enabled is preferable in order to deliver a rich experience to the user, embodiments can function even if the user has sound disabled. An embodiment checks whether sound is enabled or disabled and changes the type of advertisement content accordingly.

It is to be understood that embodiments of the fixed multi-state advertisement are not limited to online advertisements or to advertisements deployed in relation to a web page. The fixed multi-state advertisement can be deployed within a primary display space or area of any desktop application, such as a word processor, an image editing application, a video player application, a media player application, an e-mail application, a PDF viewer, the screen of a smart phone or other mobile device, etc. For instance, on many different display devices the primary display space of the display device generally occupies the entire display and may operate differently from that of a traditional window for a browser or application program. For example, it may not be possible to minimize the display space, change the size and shape of the display space, or perform other actions that can be performed on windows, but it may still be possible to scroll (up or down or left to right) the content displayed within the display space. In such instances, the fixed multi-state advertisement would still be displayed within the primary display space and be fixed relative to that space, but be independent of the content such that the content could be scrolled without changing the position of the advertisement.

In other instances, an application such as a word processor application could be displayed in a typical manner, within a window, or displayed so as to take over the entire display space of the display device. In either case, the fixed multi-state advertisement can be deployed within that primary display space of the display device as a user used the application, such as to prepare a document. Rather than charging the user for a license to use the application, the application could be provided free of charge, with advertisements presented whenever the program is opened, at one or more times throughout the use of the application by the user, whenever the user uses a particular feature of the application, etc. The partial page takeover would enable the user to continue working on the document even as the advertisement plays. Similarly, a fixed multi-state advertisement could be deployed within a video or media player at the beginning of a video or at one or more points throughout a video. What is important is for the advertisements to be displayed in a fixed position relative to the non-advertising content.

It is also to be understood, as noted above, that the fixed multi-state advertisement can be displayed within any display device and within any electronic device capable of displaying multimedia advertisements, including desktop computers, laptop computers, tablet computers, portable electronic devices, communication devices, cell phones, smartphones, portable music players, MP3 players, portable media players, an IPOD music or media player, set-top boxes, GPS devices and video game consoles.

As a first example, a GPS device may display a multi-state advertisement, with the advertisement content associated with the user's current location or with the destination location. Alternatively, a multi-state advertisement may be deployed within the GPS device based on one or more areas of interest near the user's location. As a second example, a set-top box for video on demand may deploy a multi-state advertisement before a video begins or at one or more points throughout the video. As a third example, a video game may be provided free of charge to users, with the video game displaying a multi-state advertisement whenever the video game is loaded, whenever the user saves the game progress, before or after a CGI sequence, etc.

While several embodiments have been illustrated and described herein, it is to be understood that the techniques described herein can have a multitude of additional uses and applications. Accordingly, the invention should not be limited to just the particular description and various drawing figures contained in this specification that merely illustrate the several embodiments and application of the principles of the invention.

What is claimed is:

1. An interactive advertisement display device, comprising:
   a processor;
   a memory connected to the processor;
   a display device connected to the processor and configured to display advertisement data;
   an advertisement stored in the memory and including a set of media assets and a first set of engagement devices that encourage a user to interact with the advertisement,
   wherein:
      the advertisement is configured to be positioned in a fixed position within a primary display space comprising content separate and distinct from the advertisement such that the advertisement remains in the fixed position and on the display device as the user scrolls the content displayed within the primary display space, where the advertisement is separate and distinct from the content displayed within the primary display space;
      the advertisement includes at least a first state comprising a first set of media assets, a second state having a second set of media assets and a second set of engagement devices, and a third state comprising a third set of media assets and a third set of engagement devices; and
      the first set of media assets includes one or more initial media assets; and
      a navigation bar is displayed, using the display device, within the advertisement during the second state, the navigation bar including one or more interaction prompts based on the second set of engagement devices, where the one or more interactions prompts indicate that further engagement with the second set of engagement devices displayed in the one or more interaction prompts will cause an action by the advertisement;
      when an engagement occurs with the first set of engagement devices, the advertisement transitions from the first state to the second state where the second set of media assets and the navigation bar are displayed.

2. The interactive advertisement display device as recited in claim 1, wherein an initial width and an initial height of the advertisement are changed to a second width and a second height in response to the first state changing to the second state.

3. The interactive advertisement display device as recited in claim 1, wherein a second width and a second height of the advertisement during the second state are changed to a third width and a third height in response to engagement of the second set of engagement devices displayed in the one or more interaction prompts.

4. The interactive advertisement display device as recited in claim 1, wherein the first set of engagement devices comprises a close tab displayed within the advertisement, the close tab causing the advertisement to close in response to the user interacting with the close tab.

5. The interactive advertisement display device as recited in claim 4, wherein the first set of engagement devices comprises an open tab displayed on the display device in response to the advertisement being closed, the open tab positioned in a second fixed position within the primary display space and not relative to the content displayed within the primary display space, the open tab remaining in the second fixed position and displayed to the user as the user scrolls the content, the open tab causing the advertisement to open in response to the user interacting with the open tab.

6. The interactive advertisement display device as recited in claim 1, wherein the advertisement is displayed as an overlay on the primary display space with at least a portion of the content visible behind the overlay.

7. The interactive advertisement display device as recited in claim 1, wherein the primary display space is a browser window and the content is a web page, and wherein the advertisement is initially displayed based on one or more events, the one or more events selected from a group consisting of the web page loading, the web page unloading, a mouse event, a keyboard event, a user interaction with the web page, and a timer expiring.

8. The interactive advertisement display device as recited in claim 1, wherein the primary display space is a window, and wherein the advertisement is initially displayed based on one or more events, the one or more events selected from a group consisting of the window opening, the window closing, a mouse event, a keyboard event, a user interaction with the window, a user interaction with the content, and a timer expiring.

9. The interactive advertisement display device as recited in claim 1, wherein the one or more initial media assets include one or more selected from the group consisting of a video, an animation, a static image, a static text, and a closing button that causes the one or more initial media assets to close.

10. The interactive advertisement display device as recited in claim 1, wherein the one or more initial media assets include an initial video, wherein the advertisement includes a close button allowing a user to close the advertisement after a portion of the initial video has played, wherein closing the advertisement causes the first state to change to the second state.

11. A method of displaying an interactive advertisement, comprising:

displaying an advertisement within content displayed within a primary display space using an interactive advertisement display device, wherein:

the content displayed within the primary display space is separate and distinct from the advertisement;

the advertisement comprises a set of media assets and a first set of engagement devices that encourage the user to interact with the advertisement, the advertisement is configured to be positioned in a fixed position within a primary display space comprising content separate and distinct from the advertisement such that the advertisement remains in the fixed position and displayed to the user as the user scrolls the content displayed within the primary display space using the interactive advertisement display device;

the advertisement including at least a first state comprising a first set of media assets, a second state having a second set of media assets and a second set of engagement devices, and a third state comprising a third set of media assets and a third set of engagement devices;

the first set of media assets includes one or more initial media assets; and a navigation bar displayed within the advertisement during the second state, the navigation bar including one or more interaction prompts based on the second set of engagement devices, where the one or more interactions prompts indicate that further engagement with the second set of engagement devices displayed in the one or more interaction prompts will cause an action by the advertisement; and receiving an engagement with any of the sets of engagement devices using the interactive advertisement display device;

wherein, when the engagement occurs with the first set of engagement devices, the advertisement transitions from the first state to the second state where the second set of media assets and the navigation bar are displayed using the interactive advertisement display device, and wherein, when the engagement occurs with an interaction prompt among the one or more interaction prompts using the interactive advertisement display device, the advertisement transitions to the third state where the third set of media assets and the third set of engagement devices are displayed using the interactive advertisement display device.

* * * * *